(12) United States Patent
Kim et al.

(10) Patent No.: US 11,993,232 B2
(45) Date of Patent: May 28, 2024

(54) ELECTRONIC BRAKE SYSTEM AND METHOD FOR OPERATING SAME

(71) Applicant: HL MANDO CORPORATION, Gyeonggi-do (KR)

(72) Inventors: Jin Seok Kim, Gyeonggi-do (KR); Seong Ho Choi, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 359 days.

(21) Appl. No.: 17/614,354

(22) PCT Filed: Apr. 29, 2020

(86) PCT No.: PCT/KR2020/005810
§ 371 (c)(1),
(2) Date: Nov. 25, 2021

(87) PCT Pub. No.: WO2020/242070
PCT Pub. Date: Dec. 3, 2020

(65) Prior Publication Data
US 2022/0219664 A1    Jul. 14, 2022

(30) Foreign Application Priority Data
May 31, 2019   (KR) .......................... 10-2019-0064829

(51) Int. Cl.
*B60T 13/66*    (2006.01)
*B60T 7/04*    (2006.01)
(Continued)

(52) U.S. Cl.
CPC ............ *B60T 13/686* (2013.01); *B60T 7/042* (2013.01); *B60T 8/4086* (2013.01);
(Continued)

(58) Field of Classification Search
CPC ...... B60T 13/62; B60T 13/142; B60T 13/686; B60T 17/221; B60T 7/042
(Continued)

(56) References Cited

U.S. PATENT DOCUMENTS 5,531,509 A  *  7/1996 Kellner ................... B60T 8/447
                                                        303/114.1
5,729,979 A     3/1998 Shaw et al.
(Continued)

FOREIGN PATENT DOCUMENTS

KR   10-2015-0138295      12/2015
KR   10-2016-0028043       3/2016
(Continued)

OTHER PUBLICATIONS

Office Action dated Sep. 28, 2023 for Korean Patent Application No. 10-2019-0064829 and its English translation from Global Dossier.
(Continued)

*Primary Examiner* — Christopher P Schwartz
(74) *Attorney, Agent, or Firm* — Ladas & Parry, LLP

(57) ABSTRACT

Provided is an electronic brake system including: a reservoir in which a pressurized medium is stored; an integrated master cylinder including a simulation chamber, a simulation piston provided in the simulation chamber to be displaceable by a brake pedal, a master chamber, a master piston provided in the master chamber to be displaceable by a displacement of the simulation piton or a hydraulic pressure of the simulation chamber, an elastic member provided between the simulation piston and the master piston, a piston spring elastically supporting the master piston, a simulation flow path connecting the simulation chamber to the reservoir, and a simulator valve provided in the simulation flow path to control a flow of a pressurized medium; a hydraulic
(Continued)

pressure providing unit provided to generate a hydraulic pressure by operating a hydraulic piston according to an electrical signal output in response to a displacement of the brake pedal; a hydraulic pressure control unit including a first hydraulic circuit provided to control the hydraulic pressure to be transferred to two wheel cylinders, and a second hydraulic circuit provided to control the hydraulic pressure to be transferred to other two wheel cylinders; an electronic control unit configured to control valves based on hydraulic pressure information and displacement information of the brake pedal; a backup flow path connecting the simulation chamber to the first hydraulic circuit; an auxiliary backup flow path connecting the master chamber to the backup flow path; and an inspection valve provided in the auxiliary backup flow path to control a flow of the pressurized medium.

19 Claims, 8 Drawing Sheets

(51) Int. Cl.
  *B60T 8/40* (2006.01)
  *B60T 13/14* (2006.01)
  *B60T 13/62* (2006.01)
  *B60T 13/68* (2006.01)
  *B60T 17/22* (2006.01)

(52) U.S. Cl.
  CPC ............ *B60T 13/142* (2013.01); *B60T 13/62* (2013.01); *B60T 17/221* (2013.01); *B60T 2270/402* (2013.01); *B60T 2270/404* (2013.01); *B60T 2270/406* (2013.01); *B60T 2270/82* (2013.01)

(58) Field of Classification Search
  USPC ...................................... 303/114.1
  See application file for complete search history.

(56) References Cited

U.S. PATENT DOCUMENTS

| | | | | |
|---|---|---|---|---|
| 7,331,641 | B2* | 2/2008 | Kusano | B60T 13/74 303/114.1 |
| 11,590,950 | B2* | 2/2023 | Jeong | B60T 8/1755 |
| 2004/0189086 | A1* | 9/2004 | Kusano | B60T 13/142 303/114.1 |
| 2014/0345272 | A1* | 11/2014 | Kistner | B60T 13/146 60/537 |
| 2017/0072928 | A1* | 3/2017 | Kim | B60T 11/20 |
| 2022/0203949 | A1* | 6/2022 | Kim | B60T 8/4081 |
| 2022/0227343 | A1* | 7/2022 | Kim | B60T 8/4086 |

FOREIGN PATENT DOCUMENTS

| | | |
|---|---|---|
| KR | 10-2018-0109179 | 10/2018 |
| KR | 10-2019-0029050 | 3/2019 |

OTHER PUBLICATIONS

International Search Report for PCT/KR2020/005810 dated Aug. 28, 2020 and its English translation from WIPO (now published as WO 2020/242070).

Written Opinion of the International Searching Authority for PCT/KR2020/005810 dated Aug. 28, 2020 and its English translation by Google Translate (now published as WO 2020/242070).

* cited by examiner

[Fig. 1]
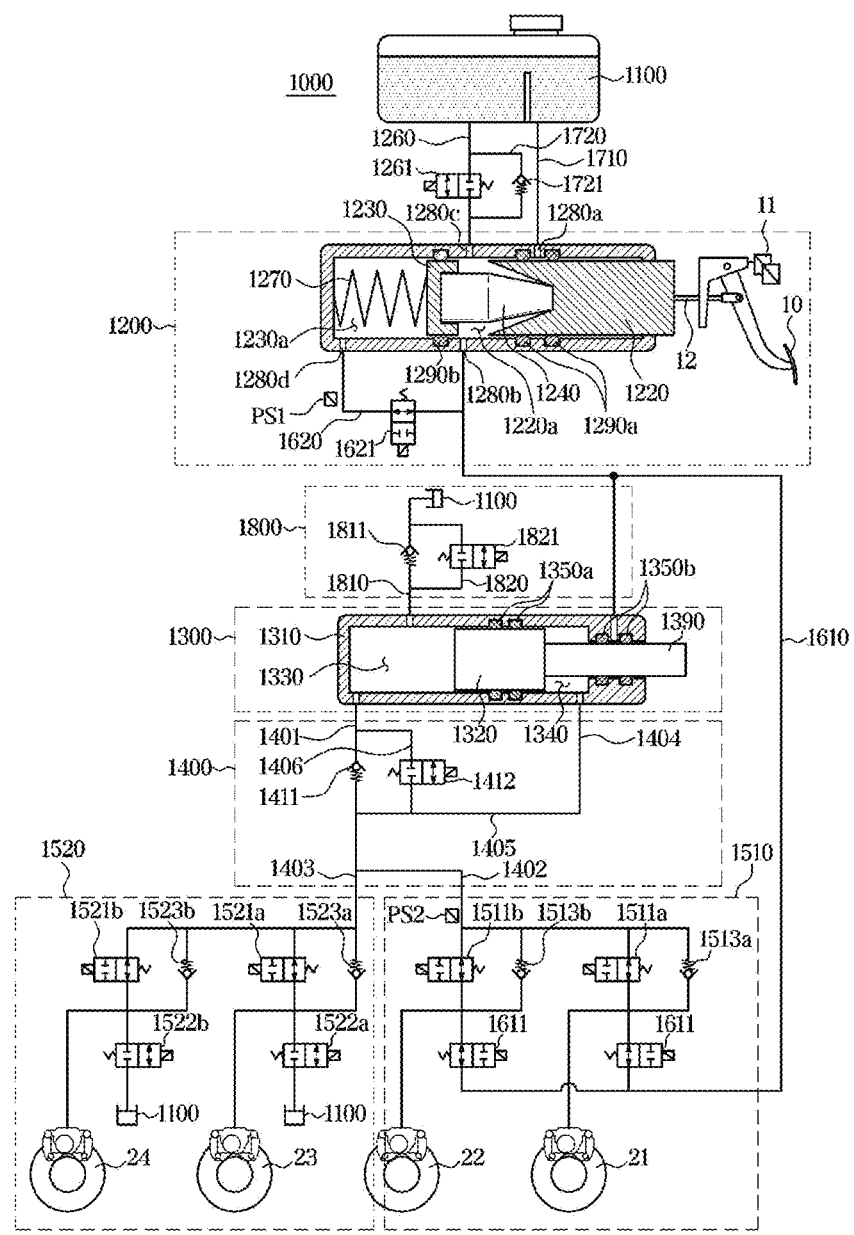

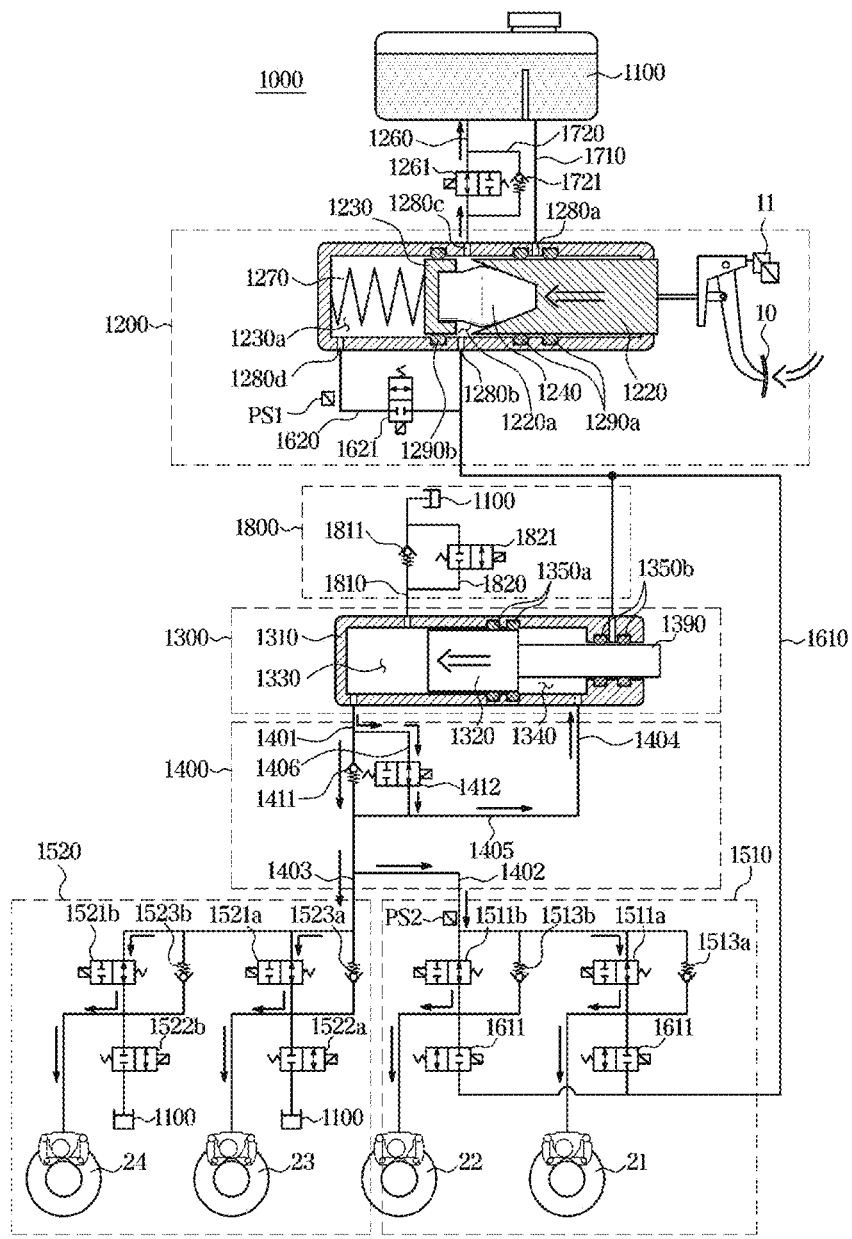
[Fig. 2]

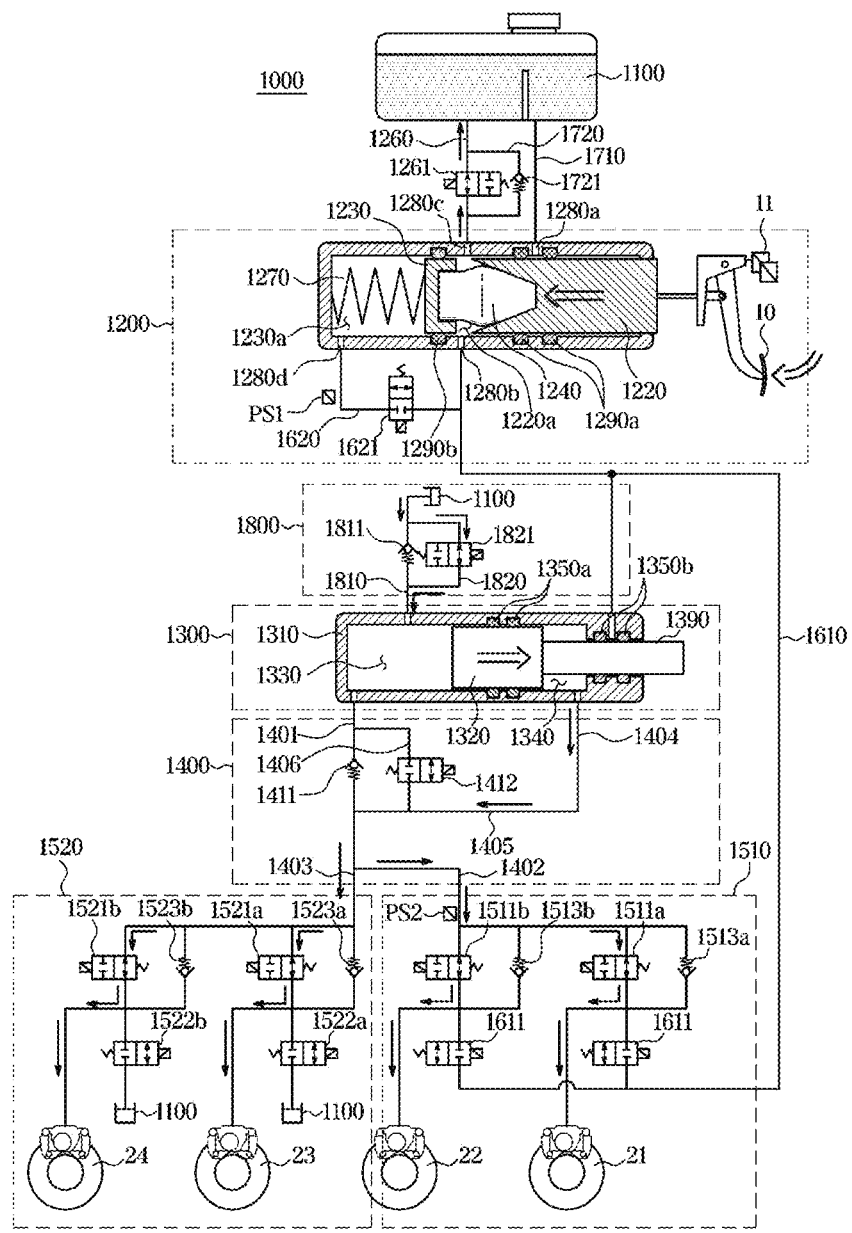
[Fig. 3]

[Fig. 4]
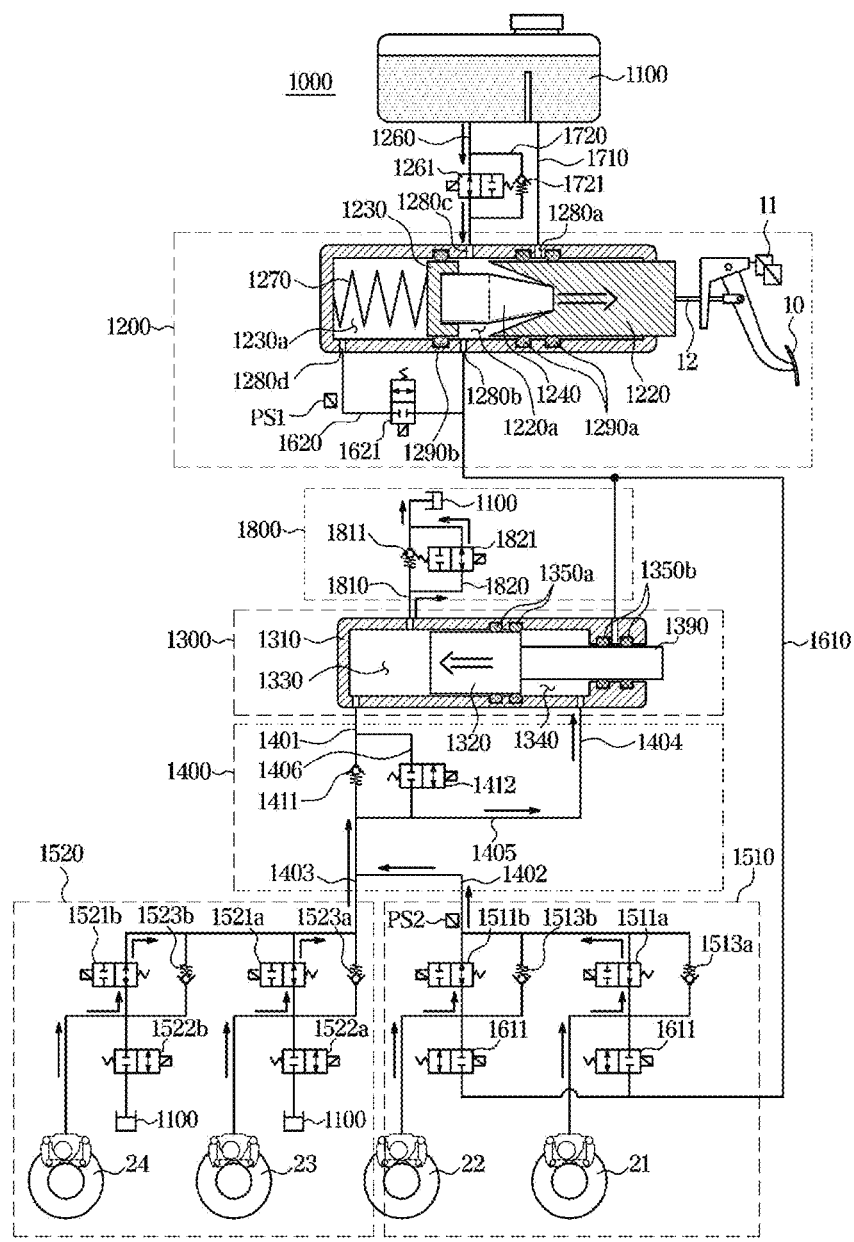

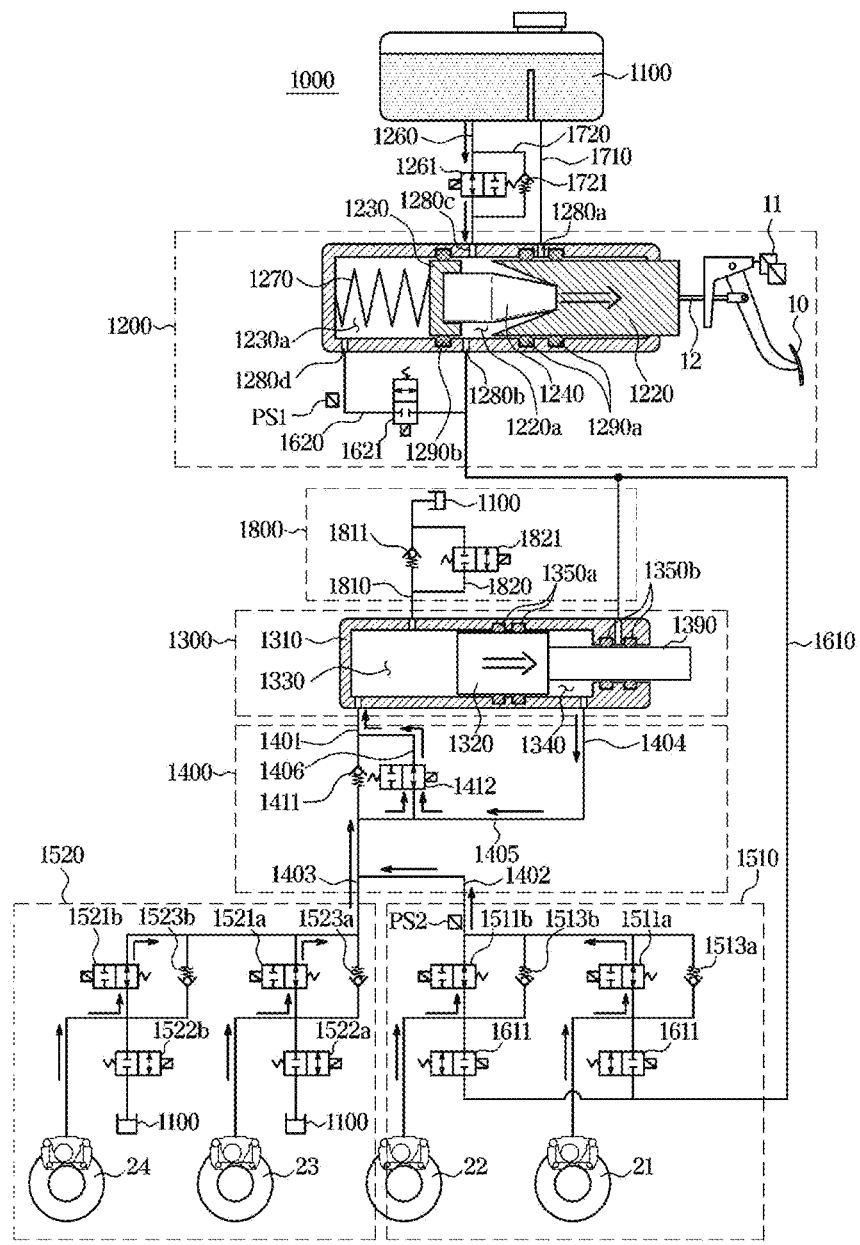
[Fig. 5]

[Fig. 6]
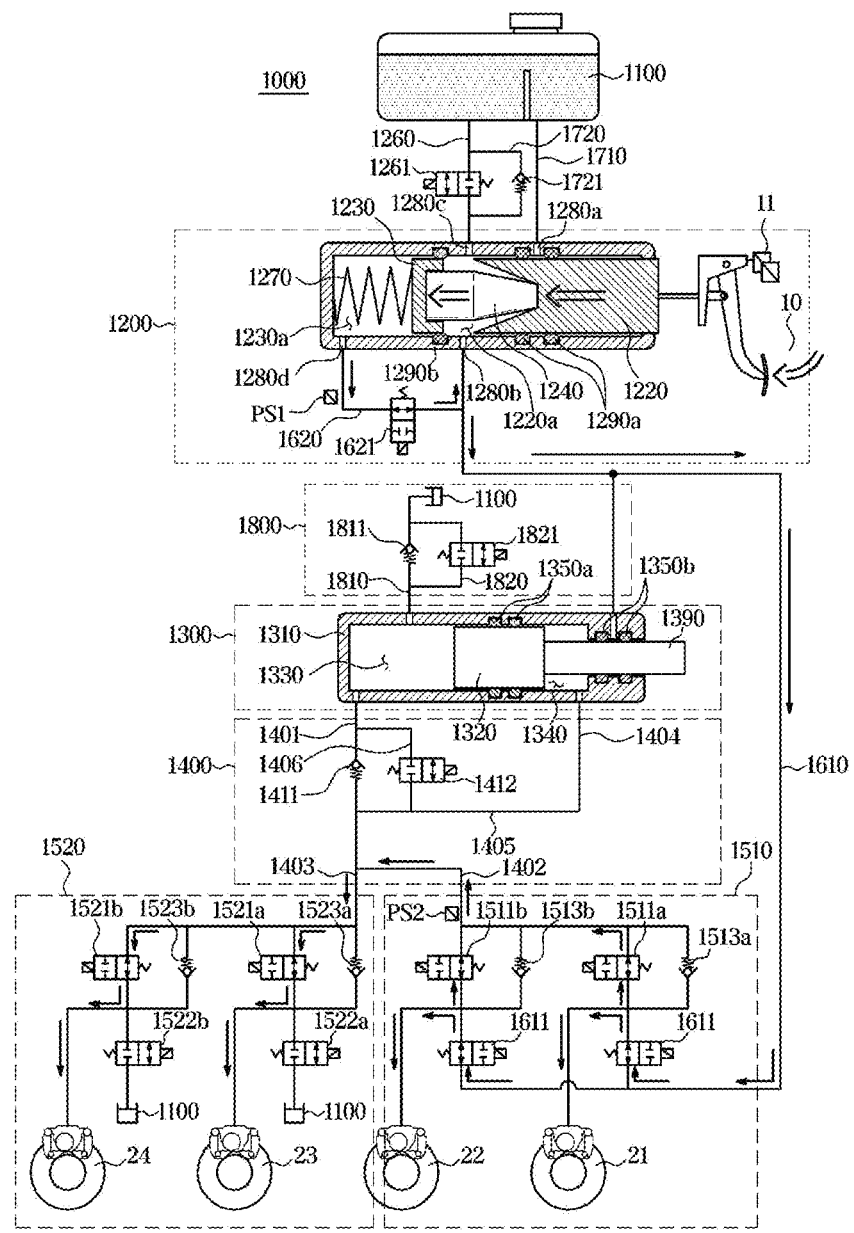

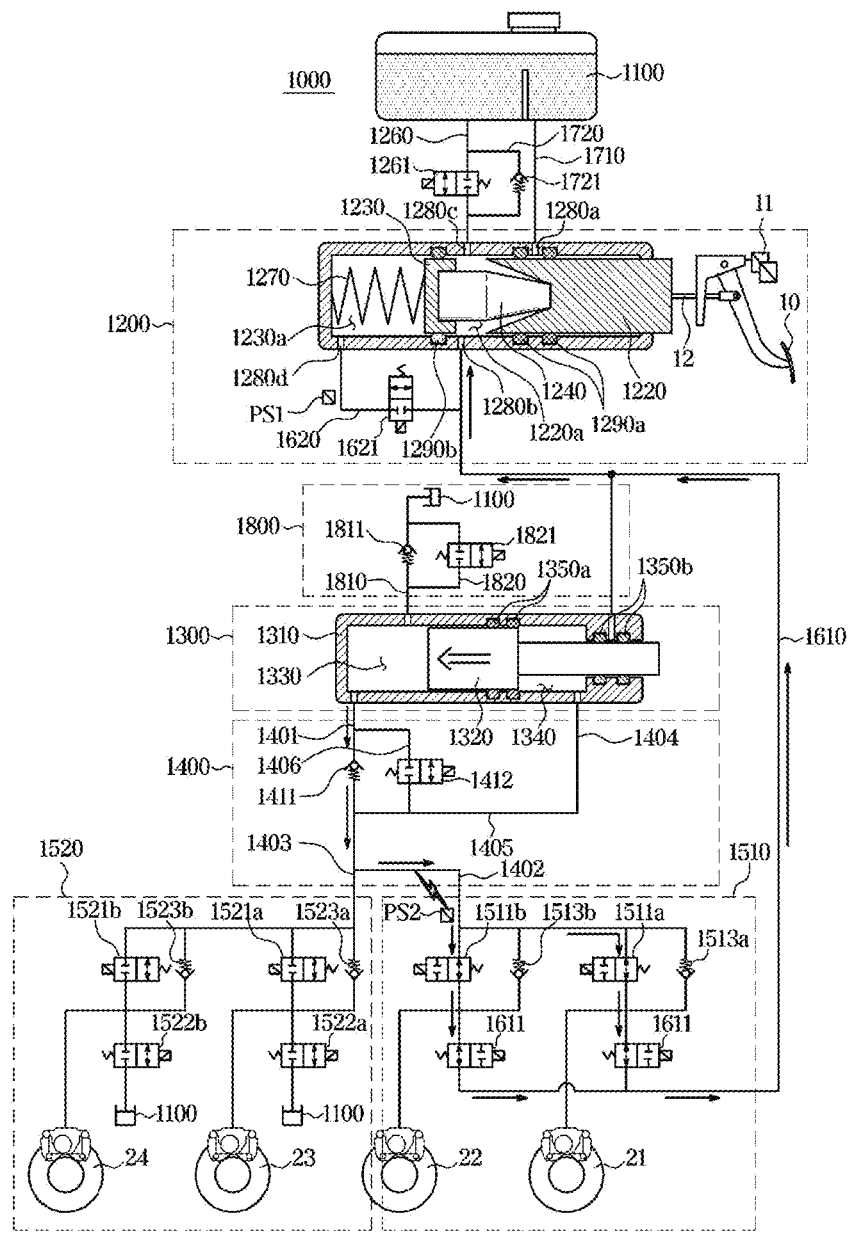
[Fig. 7]

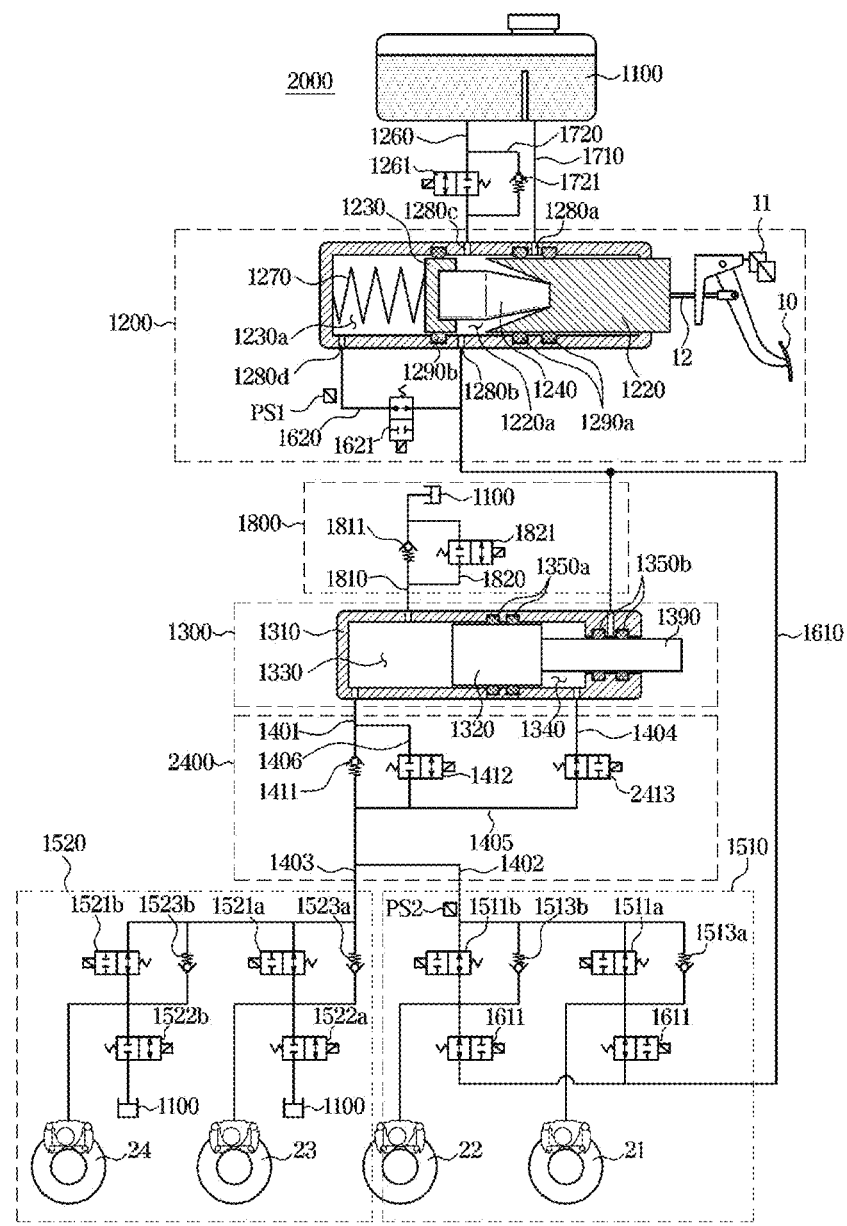
[Fig. 8]

ELECTRONIC BRAKE SYSTEM AND METHOD FOR OPERATING SAME

CROSS-REFERENCE TO RELATED APPLICATIONS

The present application is the national stage of International Patent Application No. PCT/KR2020/005810 filed on Apr. 29, 2020, which claims the priority to Korean Patent Application No. 10-2019-0064829 filed in the Korean Intellectual Office on May 31, 2019, the entire contents of which are incorporated herein by reference.

TECHNICAL FIELD

The present disclosure relates to an electronic brake system and an operation method thereof, and more particularly, to an electronic brake system and an operation method thereof for generating a braking force using an electrical signal corresponding to a displacement of a brake pedal.

BACKGROUND ART

In general, vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system, that receives an electrical signal corresponding to a pressing force by a driver from a pedal displacement sensor that detects a displacement of a brake pedal when the driver depresses the brake pedal and operates a hydraulic pressure providing unit based on the electric signal to supply a hydraulic pressure required for braking to wheel cylinders, have been widely used.

In such an electronic brake system, an electrical signal is generated and provided when a driver depresses the brake pedal in a normal operation mode, and based on the electric signal, the hydraulic pressure providing unit is electrically operated and controlled to generate a hydraulic pressure required for braking and transfer the hydraulic pressure to the wheel cylinders. As such, although such an electronic brake system and an operation method are electrically operated and controlled so that complex and various braking operations may be implemented, when a technical problem occurs in an electric component, a hydraulic pressure required for braking may not be stably generated, and thus the safety of passengers may not be secured.

Therefore, the electronic brake system enters the abnormal operation mode when a component fails or becomes out of control, and in this case, a mechanism is required in which the operation of the brake pedal by a driver is directly linked to the wheel cylinders. That is, in the abnormal operation mode in the electronic brake system, as the driver depresses the brake pedal, a hydraulic pressure required for braking needs to be generated immediately and transferred directly to the wheel cylinders.

DISCLOSURE

Technical Problem

The present disclosure is directed to providing an electronic brake system capable of reducing the number of parts to be applied and achieving a miniaturization and lightweight of a product.

The present disclosure is directed to providing an electronic brake system capable of effectively implementing braking in various operating situations.

The present disclosure is directed to providing an electronic brake system capable of stably generating a high-pressure braking pressure.

The present disclosure is directed to providing an electronic brake system capable of improving performance and operational reliability.

The present disclosure is directed to providing an electronic brake system capable of improving durability of a product by reducing loads applied to components.

The present disclosure is directed to providing an electronic brake system capable of improving easiness of assembly and productivity of a product and reducing a manufacturing cost of the product.

Technical Solution

An aspect of the present disclosure provides an electronic brake system including: a reservoir in which a pressurized medium is stored; an integrated master cylinder including a simulation chamber, a simulation piston provided in the simulation chamber to be displaceable by a brake pedal, a master chamber, a master piston provided in the master chamber to be displaceable by a displacement of the simulation piton or a hydraulic pressure of the simulation chamber, an elastic member provided between the simulation piston and the master piston, a piston spring elastically supporting the master piston, a simulation flow path connecting the simulation chamber to the reservoir, and a simulator valve provided in the simulation flow path to control a flow of a pressurized medium; a hydraulic pressure providing unit provided to generate a hydraulic pressure by operating a hydraulic piston according to an electrical signal output in response to a displacement of the brake pedal; a hydraulic pressure control unit including a first hydraulic circuit provided to control the hydraulic pressure to be transferred to two wheel cylinders, and a second hydraulic circuit provided to control the hydraulic pressure to be transferred to other two wheel cylinders; an electronic control unit configured to control valves based on hydraulic pressure information and displacement information of the brake pedal; a backup flow path connecting the simulation chamber to the first hydraulic circuit; an auxiliary backup flow path connecting the master chamber to the backup flow path; and an inspection valve provided in the auxiliary backup flow path to control a flow of the pressurized medium.

The hydraulic pressure providing device may include: a first pressure chamber provided on one side of the hydraulic piston movably accommodated in a cylinder block to be connected to one or more of the wheel cylinders; and a second pressure chamber provided on an other side of the hydraulic piston to be connected to one or more of the wheel cylinders, and wherein the hydraulic pressure control unit may include: a first hydraulic flow path in communication with the first pressure chamber; a second hydraulic flow path branched from the first hydraulic flow path to be connected to the first hydraulic circuit; a third hydraulic flow path branched from the first hydraulic flow path to be connected to the second hydraulic circuit; a fourth hydraulic flow path in communication with the second pressure chamber; a fifth hydraulic flow path connecting the first hydraulic flow path to fourth hydraulic flow path; and a sixth hydraulic flow path branched from the first hydraulic flow path to be connected to the fifth hydraulic flow path.

The hydraulic pressure control unit may include a first vale provided in the first hydraulic flow path to control a flow of the pressurized medium and a second vale provided in the sixth hydraulic flow path to control a flow of the pressurized medium.

The first valve may be provided as a check valve for allowing only a flow of the pressurized medium discharged from the first pressure chamber, and the second valve may be provided as a solenoid valve for controlling bidirectional flows of the pressurized medium.

The electronic brake system may further include a cut valve provided in the back up flow path to control a flow of the pressurized medium.

The electronic brake system may further include a reservoir flow path configured to communicate the integrated master cylinder with the reservoir, and wherein the reservoir flow path may include a first reservoir flow path connecting the reservoir to the simulation chamber and a second reservoir flow path branched from an upstream side of the simulation flow path and rejoining at a downstream side of the simulation flow path.

The electronic brake system may further include a reservoir valve provided in the second reservoir flow path, and allowing only a flow of the pressurized medium from the reservoir toward the simulation chamber.

The first hydraulic circuit may include: a first inlet valve and a second inlet valve provided to control the flow of the pressurized medium to be supplied to a first wheel cylinder and a second wheel cylinder, respectively; and the second hydraulic circuit may include: a third inlet valve and a fourth inlet valve provided to control the flow of the pressurized medium to be supplied to a third wheel cylinder and a fourth wheel cylinder, respectively, and a first outlet valve and a second outlet valve provided to control the flow of the pressurized medium to be discharged from the third wheel cylinder and the fourth wheel cylinder to the reservoir, respectively, and the backup flow path may be provided to connect at least one of downstream sides of the first and second inlet valves to the simulation chamber.

The electronic brake system may further include a dump controller provided between the reservoir and the hydraulic pressure providing device to control a flow of the pressurized medium, wherein the dump controller may include: a dump flow path provided to connect the first pressure chamber to the reservoir; a dump check valve provided in the dump flow path to allow only a flow of the pressurized medium from the reservoir toward the first pressure chamber; a bypass flow path connected in parallel to the dump check valve on the dump flow path; and a dump valve provided in the bypass flow path to control bidirectional flows of the pressurized medium.

The hydraulic pressure control unit further includes a third valve provided in the fourth hydraulic flow path to control a flow of the pressurized medium.

The third valve may be provided as a solenoid valve for controlling bidirectional flows of the pressurized medium.

Another aspect of the present disclosure provides an operation method of the electronic brake system according to claim 4, including a first braking mode in which, as the hydraulic pressure of the pressurized medium transferred from the hydraulic pressure providing unit to the wheel cylinder gradually increases, the hydraulic pressure is primarily provided according to a forward movement of the hydraulic piston; and a second braking mode in which the hydraulic pressures is secondarily provided according to a backward movement of the hydraulic piston after the first braking mode.

In the first braking mode, the second valve may be opened, and the hydraulic pressure generated in the first pressure chamber according to a forward movement of the hydraulic piston may be provided to the first hydraulic circuit by sequentially passing through the first hydraulic flow path and the second hydraulic flow path, and provided to the second hydraulic circuit by sequentially passing through the first hydraulic flow path and the third hydraulic flow path, and at least a part of the hydraulic pressure generated in the first pressure chamber may be provided to the second pressure chamber by sequentially passing through the first hydraulic flow path, the sixth hydraulic flow path, the fifth hydraulic flow path, and the fourth hydraulic flow path.

In the second braking mode, the second valve may be closed, and the hydraulic pressure generated in the second pressure chamber according to a backward movement of the hydraulic piston after the first braking mode may be provided to the first hydraulic circuit by sequentially passing through the fourth hydraulic flow path, the fifth hydraulic flow path, and the second hydraulic flow path, and provided to the second hydraulic circuit by sequentially passing through the fourth hydraulic flow path, the fifth hydraulic flow path, and the third hydraulic flow path.

In a releasing of the first braking mode, the second valve may be opened, and a negative pressure may be generated in the first pressure chamber according to a backward movement of the hydraulic piston such that the pressurized medium provided to the first hydraulic circuit may be recovered to the first pressure chamber by sequentially passing through the second hydraulic flow path, the fifth hydraulic flow path, the sixth hydraulic flow path, and the first hydraulic flow path, and the pressurized medium provided to the second hydraulic circuit may be recovered to the first pressure chamber by sequentially passing through the third hydraulic flow path, the fifth hydraulic flow path, the sixth hydraulic flow path, and the first hydraulic flow path, and the pressurized medium in the second pressure chamber may be supplied to the first pressure chamber by sequentially passing through the fourth hydraulic flow path, the fifth hydraulic flow path, the sixth hydraulic flow path, and the first hydraulic flow path.

In a releasing of the second braking mode, the second valve may be closed, and a negative pressure may be generated in the second pressure chamber according to a forward movement of the hydraulic piston such that the pressurized medium provided to the first hydraulic circuit may be recovered to the second pressure chamber by sequentially passing through the second hydraulic flow path, the fifth hydraulic flow path, and the fourth hydraulic flow path, and the pressurized medium provided to the second hydraulic circuit may be recovered to the second pressure chamber by sequentially passing through the third hydraulic flow path, the fifth hydraulic flow path, and the fourth hydraulic flow path.

Another aspect of the present disclosure provides an operation method of the electronic brake system according to claim 5, wherein in a normal operation mode, the inspection valve is closed to seal the master chamber, and the cut valve is closed but the simulator valve is opened to communicate the simulation chamber with the reservoir such that as the brake pedal operates for the simulation piston to compress the elastic member, and an elastic restoring force of the elastic member is provided to a driver as a pedal feeling.

In an abnormal operation mode, the inspection valve may be opened for the master chamber to communicate with the first hydraulic circuit, and the simulator valve may be closed but the cut valve may be opened for the simulation chamber to communicate with the first hydraulic circuit, and the pressurized medium in the simulation chamber may be provided to the first hydraulic circuit through the backup flow path according to a stepping force of the brake pedal, the pressurized medium in the mater chamber may be provided to the first hydraulic circuit by sequentially passing through the auxiliary backup flow path and the backup flow path, and at least a part of the pressurized medium provided to the first hydraulic circuit may be provided to the second hydraulic circuit.

In an inspection mode of inspecting a leak of the integrated master cylinder or the simulator valve, the simulator valve and the inspection valve may be closed, the hydraulic pressure generated according to an operation of the hydraulic pressure providing unit may be provided to the simulation chamber by sequentially passing through the hydraulic pressure control unit and the backup flow path, and an expected hydraulic pressure value expected to occur based on a displacement amount of the hydraulic piston may be compared with a hydraulic pressure value measured by a pressure sensor in the first hydraulic circuit or the simulation chamber to identify a leak.

Advantageous Effects

An electronic brake system according to the present embodiment can reduce the number of parts to be applied and achieve a miniaturization and lightweight of a product.

The electronic brake system according to the present embodiment can stably and effectively implement braking in various operating situations of a vehicle.

The electronic brake system according to the present embodiment can stably generate a high-pressure braking pressure.

The electronic brake system according to the present embodiment can improve performance and operational reliability of the product.

The electronic brake system according to the present embodiment can stably provide a braking pressure even when a component fails or a pressurized medium leaks.

The electronic brake system according to the present embodiment can improve durability of the product by reducing loads applied to components.

The electronic brake system according to the present embodiment can improve easiness of assembly and productivity of the product and reduce a manufacturing cost of the product.

DESCRIPTION OF DRAWINGS

FIG. 1 is a hydraulic circuit diagram illustrating an electronic brake system according to a first embodiment of the present disclosure.

FIG. 2 is a hydraulic circuit diagram illustrating that the electronic brake system according to the first embodiment of the present disclosure performs a first braking mode.

FIG. 3 is a hydraulic circuit diagram illustrating that the electronic brake system according to the first embodiment of the present disclosure performs a second braking mode.

FIG. 4 is a hydraulic circuit diagram illustrating that the electronic brake system according to the first embodiment of the present disclosure releases the second braking mode.

FIG. 5 is a hydraulic circuit diagram illustrating that the electronic brake system according to the first embodiment of the present disclosure releases the first braking mode.

FIG. 6 is a hydraulic circuit diagram illustrating that the electronic brake system according to the first embodiment of the present disclosure performs an abnormal operation mode (fallback mode).

FIG. 7 is a hydraulic circuit diagram illustrating that the electronic brake system according to the first embodiment of the present disclosure performs an inspection mode.

FIG. 8 is a hydraulic circuit diagram illustrating an electronic brake system according to a second embodiment of the present disclosure.

MODE OF THE DISCLOSURE

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration.

FIG. 1 is a hydraulic circuit diagram illustrating an electronic brake system 1000 according to a first embodiment of the present disclosure.

Referring to FIG. 1, the electronic brake system 1000 according to the first embodiment of the present disclosure includes an integrated master cylinder 1200, a reservoir 1100 in which a pressurized medium is stored, a hydraulic pressure providing unit 1300 provided to receive an electrical signal corresponding to a braking intention by a driver from a pedal displacement sensor 11 that detects a displacement of the brake pedal 10 and to generate a hydraulic pressure of the pressurized medium through a mechanical operation, a hydraulic pressure control unit 1400 provided to control the hydraulic pressure provided from the hydraulic pressure providing unit 1300, first and second hydraulic circuits 1510 and 1520 having wheel cylinders 21, 22, 23, and 24 for braking respective heels RR, RL, FR, and FL as the hydraulic pressure of the pressurized medium is transferred, a dump controller 1800 provided between the hydraulic pressure providing unit 1300 and the reservoir 1100 to control a flow of the pressurized medium, a backup flow path 1610 provided to hydraulically connect the integrated master cylinder 1200 and the first and second hydraulic circuits 1510 and 1520, a reservoir flow path 1700 provided to hydraulically connect the reservoir 1100 and the integrated master cylinder 1200, and an electronic control unit (ECU, not shown) provided to control the hydraulic pressure providing unit 1300 and various valves based on hydraulic pressure information and pedal displacement information.

The integrated master cylinder 1200 includes a master chamber 1230*a* and a simulation chamber 1220*a* to, when the driver presses the brake pedal 10 for braking operation, provide a reaction force against the pressing to the driver to provide a stable pedal feel, and at the same time pressurize and discharge the pressurized medium accommodated therein.

The integrated master cylinder 1200 may be divided into a pedal simulation part to provide a pedal feel to the driver, and a master cylinder part to transfer the pressurized medium to the first and second hydraulic circuits 1510 and 1520 side, which will be described below. The integrated master cylinder 1200 may be configured such that the pedal simulation part and the master cylinder part are sequentially provided from the brake pedal 10 side and disposed coaxially within a cylinder block 1210.

Specifically, the integrated master cylinder 1200 may include the cylinder block 1210 having a chamber formed therein, the simulation chamber 1220a formed on an inlet side of the cylinder block 1210 to which the brake pedal 10 is connected, a simulation piston 1220 provided in the simulation chamber 1220a and connected to the brake pedal 10 to be displaceable depending on the operation of the brake pedal 10, the master chamber 1230a formed more inside than the simulation chamber 1220a on the cylinder block 1210, a master piston 1230 provided in the master chamber 1230a to be displaceable by a displacement of the simulation piston 1220 or a hydraulic pressure of the pressurized medium accommodated in the simulation chamber 1220a, an elastic member 1240 disposed between the simulation piston 1220 and the master piston 1230 to provide a pedal feeling through an elastic restoring force generated during compression, a piston spring 1270 provided to elastically support the master piston 1230, a first simulator spring (not shown) provided to elastically support the simulation piston 1220 on the cylinder block 1210, a second simulator spring (not shown) provided to elastically support the simulation piston 1220 while being interposed between the simulation piston 1220 and the master piston 1230, a simulation flow path 1260 provided to connect the simulation chamber 1220a to the reservoir 1100, and a simulator valve 1261 provided in the simulation flow path 1260 to control the flow of the pressurized medium.

The simulation chamber 1220a and the master chamber 1230a may be sequentially formed toward the inside (left side of FIG. 1) from the brake pedal 10 side (right side of FIG. 1) on the cylinder block 1210 of the integrated master cylinder 1200. Also, the simulation piston 1220 and the master piston 1230 are disposed in the simulation chamber 1220a and the master chamber 1230a, respectively, to generate a hydraulic pressure or a negative pressure by the pressurized medium accommodated in the respective chambers depending on forward or backward movement.

The simulation chamber 1220a may be formed on the inlet side or the outermost side (right side of FIG. 1) of the cylinder block 1210, and the simulation piston 1220 connected to the brake pedal 10 via an input rod 12 may be accommodated in the simulation chamber 1220a to enable reciprocating movement.

The pressurized medium may be introduced into and discharged from the simulation chamber 1220a through a first hydraulic port 1280a, a second hydraulic port 1280b, and a third hydraulic port 1280c. The first hydraulic port 1280a is connected to a first reservoir flow path 1710, which will be described below, so that the pressurized medium may be introduced into the simulation chamber 1220a from the reservoir 1100, and the third hydraulic port 1280c is connected to the simulation flow path 1260, which will be described below, so that the pressurized medium accommodated in the simulation chamber 1220a may be discharged to the reservoir 1100 side, or conversely, the pressurized medium may be introduced from the reservoir 1100. In addition, the second hydraulic port 1280b is connected to a backup flow path 1610, which will be described below, so that the pressurized medium may be discharged from the simulation chamber 1220a into the backup flow path 1610, or conversely, the pressurized medium may be introduced into the simulation chamber 1220a from the backup flow path 1610. A pair of sealing members 1290a are provided in front and rear of the first hydraulic port 1280a to prevent leakage of the pressurized medium. The pair of sealing members 1290a may allow the flow of the pressurized medium from the reservoir 1100 toward the simulation chamber 1220a through the first reservoir flow path 1710, while blocking the flow of the pressurized medium from the simulation chamber 1220a toward the first reservoir flow path 1710.

The simulation piston 1220 may be accommodated in the simulation chamber 1220a, and configured to generate a hydraulic pressure of the pressurized medium accommodated in the simulation chamber 1220a, or pressurize the elastic member 1240, which will be described below, by moving forward, and configured to generate a negative pressure inside the simulation chamber 1220a or return the elastic member 1240 to its original position and shape by moving backward.

The master chamber 1230a may be formed at an inner side (left side of FIG. 1) of the simulation chamber 1220a on the cylinder block 1210, and the master piston 1230 may be accommodated in the master chamber 1230a to enable reciprocating movement.

The pressurized medium may be introduced into and discharged from the master chamber 1230a through a fourth hydraulic port 1280d. The fourth hydraulic port 1280d is connected to an auxiliary backup flow path 1620, which will be described below, so that the pressurized medium accommodated in the master chamber 1230a may be discharged into the backup flow path 1610 side, or conversely, the pressurized medium may be introduced from the backup flow path 1610 toward the master chamber 1230a.

The master piston 1230 may be accommodated in the master chamber 1230a, and configured to generate a hydraulic pressure of the pressurized medium accommodated in the master chamber 1230a by moving forward, or generate a negative pressure inside the master chamber 1230a by moving backward. At least one sealing member 1290b may be provided between an inner wall of the cylinder block 1210 and an outer circumferential surface of the master piston 1230 to prevent leakage of the pressurized medium between the adjacent chambers.

The integrated master cylinder 1200 according to the present embodiment may secure safety in the event of a failure of a component by including the simulation chamber 1220a and the master chamber 1230a. For example, the simulation chamber 1220a may be connected to any wheel cylinders 21, 22, 23, and 24 of a right front wheel FR, a left front wheel FL, a left rear wheel RL, and a right rear wheel RR through the backup flow path 1610, which will be described below, and thus even when a problem such as a leak in any one of the chambers occurs, it may be possible to brake the vehicle. A detailed description thereof will be described below with reference to FIG. 6.

The elastic member 1240 is interposed between the simulation piston 1220 and the master piston 1230 and provided to provide a pedal feeling of the brake pedal 10 to the driver by its own elastic restoring force. The elastic member 1240 may be made of a material such as compressible and expandable rubber, and when a displacement occurs in the simulation piston 1220 by the operation of the brake pedal 10, but when the master piston 1230 is maintained in an original position thereof, the elastic member 1240 is compressed, and the driver may receive a stable and familiar pedal feel by the elastic restoring force of the compressed elastic member 1240. A detailed description thereof will be described below.

Accommodating grooves recessed in a shape corresponding to the shape of the elastic member 1240 to facilitate smooth compression and deformation of the elastic member 1240 may be provided on a rear surface (left surface of FIG. 1) of the simulation piston 1220 and a front surface (right surface of FIG. 1) of the master piston 1230, which face the elastic member 1240, respectively.

The piston spring 1270 is provided to elastically support the master piston 1230. One end of the piston spring 1270 may be supported on the cylinder block 1210, and the other end may be supported on the master piston 1230, to elastically support the master piston 1230. When the master piston 1230 moves forward according to a braking operation and a displacement occurs, the piston spring 1270 is compressed, and when the braking is released, as the piston spring 1270 expands by an elastic force thereof, the master piston 1230 may return to the original position.

The simulation flow path 1260 is provided to connect a rear side of the simulation chamber 1220a (left side of FIG. 1) to the reservoir 1100. A simulator valve 1261 for controlling bidirectional flows of the pressurized medium may be provided in the simulation flow path 1260. The simulator valve 1261 may be provided as a normally closed type solenoid valve that operates to be opened when an electric signal is received from the electronic control unit in a normally closed state. The simulator valve 1261 may be opened in a normal operation mode of the electronic brake system 1000. The simulator valve 1261 may be closed in a normal operation of the electronic brake system 1000 to seal the simulation chamber 1220a, and may be closed in an inspection mode of inspecting whether the integrated master cylinder 1200 or the simulator valve 1261 has a leak. A detailed description thereof will be provided below.

The auxiliary backup flow path 1620 is provided to connect the master chamber 1230a to the backup flow path 1610 to communicate the simulation chamber 1220a with the master chamber 1230a. The auxiliary backup flow path 1620 may be provided with an inspection valve 1621 for controlling bidirectional flows of the pressurized medium. The inspection valve 1621 may be provided as a normally open type solenoid valve that operates to be closed when an electric signal is received from the electronic control unit in a normally open state. The inspection valve 1621 may be closed in a normal operation mode of the electronic brake system 1000.

The reservoir 1100 may accommodate and store the pressurized medium therein. The reservoir 1100 may be connected to each component such as the integrated master cylinder 1200, the hydraulic pressure providing unit 1300, which will be described below, and the hydraulic circuits, which will be described below, to supply or receive the pressurized medium. Although a plurality of the reservoirs 1100 is shown with the same reference numeral in the drawings, this is only an example for better understanding of the present disclosure, and the reservoir 1100 may be provided as a single component, or a plurality of the separate and independent reservoirs 1100 may be provided.

The reservoir flow path 1700 is provided to connect the integrated master cylinder 1200 and the reservoir 1100.

The reservoir flow path 1700 may include the first reservoir flow path 1710 connecting a front side (right side of FIG. 1) of the simulation chamber 1220a to the reservoir 1100 and the second reservoir flow path 1720 branched from an upstream side of the simulation flow path 1260 connecting a rear side (left of FIG. 1) of the simulation chamber 1220a to the reservoir 1100 and then rejoining at a downstream side of the simulation flow path 1260. To this end, one ends of the first reservoir flow path 1710 and the simulation flow path 1260 may communicate with the simulation chamber 1220a of the integrated master cylinder 1200 and the other ends may communicate with the reservoir 1100.

A reservoir valve 1721 for controlling a flow of a pressurized medium may be provided in the second reservoir flow path 1720. The reservoir valve 1721 may be provided as a check valve for allowing the flow of the pressurized medium from the reservoir 1100 toward the simulation chamber 1220a, while blocking the flow of the pressurized medium from the simulation chamber 1220a toward the reservoir 1100.

Explaining a pedal simulation operation by the integrated master cylinder 1200, in a normal operation, at the same time as the driver operates the brake pedal 10, a cut valve 1611 provided in each of the backup flow paths 1610, which will be described below, is closed, while the inspection valve 1621 of the auxiliary backup flow path 1620 is closed and the simulator valve 1261 of the simulation flow path 1260 is opened. As the operation of the brake pedal 10 progresses, the simulation piston 1220 moves forward, but since the simulation chamber 1220a is sealed by a closing operation of the cut valve 1611, the hydraulic pressure of the pressurized medium accommodated in the simulation chamber 1220a is transferred to the simulation piston 1220, so that the simulation piston 1220 moves forward to generate a displacement. On the other hand, as the inspection valve 1621 is closed, the master chamber 1230a is sealed so that a displacement of the master piston 1230 is not generated, and thus the elastic member 1240 is compressed by the displacement of the simulation piston 1220, and the elastic restoring force by compression of the elastic member 1240 may be provided to the driver as a pedal feeling. In this case, the pressurized medium accommodated in the simulation chamber 1220a is transferred to the reservoir 1100 through the simulation flow path 1260. After that, when the driver releases the pressing force of the brake pedal 10, the elastic member 1240 returns to the original shape and position thereof by the elastic restoring force, and the simulation chamber 1220a may be filled with the pressurized medium supplied from the reservoir 1100 through the simulation flow path 1260.

As such, because the inside of the simulation chamber 1220a and the master chamber 1230a is always filled with the pressurized medium, when the pedal simulation is operated, friction of the simulation piston 1220 and the master piston 1230 is minimized, so that the durability of the integrated master cylinder 1200 is improved, and the inflow of foreign substances from the outside may be blocked.

A case in which the electronic brake system 1000 operates abnormally, that is, an operation of the integrated master cylinder 1200 in a fallback mode will be described below with reference to FIG. 6.

The hydraulic pressure providing unit 1300 is provided to receive an electrical signal corresponding to a pressing force of the driver from the pedal displacement sensor 11 detecting a displacement of the brake pedal 10 and to generate a hydraulic pressure of the pressurized medium through a mechanical operation.

The hydraulic pressure providing unit 1300 may include a hydraulic pressure providing unit to provide a pressure to the pressurized medium to be transferred to the wheel cylinders 21, 22, 23, and 24, a motor (not shown) to generate a rotational force by an electrical signal from the pedal displacement sensor 11, and a power conversion unit (not shown) to convert a rotational motion of the motor into a linear motion to provide the linear motion to the hydraulic pressure providing unit.

The hydraulic pressure providing unit includes a cylinder block 1310 provided such that the pressurized medium may be accommodated, a hydraulic piston 1320 accommodated in the cylinder block 1310, a sealing member 1350 provided between the hydraulic piston 1320 and the cylinder block 1310 to seal the pressure chambers 1330 and 1340, and a drive shaft 1390 to transfer power output from the power conversion unit to the hydraulic piston 1320.

The pressure chambers 1330 and 1340 may include the first pressure chamber 1330 located in the front of the hydraulic piston 1320 (left direction of the hydraulic piston 1320 in FIG. 1), and the second pressure chamber 1340 located in the rear of the hydraulic piston 1320 (right direction of the hydraulic piston 1320 in FIG. 1). That is, the first pressure chamber 1330 is provided to be partitioned by the cylinder block 1310 and a front surface of the hydraulic piston 1320 so that a volume thereof varies depending on the movement of the hydraulic piston 1320, and the second pressure chamber 1340 is provided to be partitioned by the cylinder block 1310 and a rear surface of the hydraulic piston 1320 so that a volume thereof varies depending on the movement of the hydraulic piston 1320.

The first pressure chamber 1330 is connected to a first hydraulic flow path 1401, which will be described below, and the second pressure chamber 1340 is connected to a fourth hydraulic flow path 1404, which will be described below.

The sealing members include a piston sealing member 1350*a* provided between the hydraulic piston 1320 and the cylinder block 1310 to seal between the first pressure chamber 1330 and the second pressure chamber 1340, and a drive shaft sealing member 1350*b* provided between the drive shaft 1390 and the cylinder block 1310 to seal between the second pressure chamber 1340 and an opening of the cylinder block 1310. The hydraulic pressure or negative pressure of the first pressure chamber 1330 and the second pressure chamber 1340 generated by the forward or backward movement of the hydraulic piston 1320 may not leak by being sealed by the piston sealing member 1350*a* and the drive shaft sealing member 1350*b* and may be transferred to the first hydraulic flow path 1401 and the fourth hydraulic flow path 1404, which will be described below.

The motor (not shown) is provided to generate a driving force of the hydraulic piston 1320 by an electric signal output from the electronic control unit. The motor may include a stator and a rotor, and through this configuration, may provide power to generate a displacement of the hydraulic piston 1320 by rotating in a forward or reverse direction. A rotational angular speed and a rotational angle of the motor may be precisely controlled by a motor control sensor. Because the motor is a well-known technology, a detailed description thereof will be omitted.

The power conversion unit (not shown) is provided to convert a rotational force of the motor into a linear motion. The power conversion unit may be provided as a structure including, for example, a worm shaft (not shown), a worm wheel (not shown), and the drive shaft 1390.

The worm shaft may be integrally formed with a rotation shaft of the motor and may rotate the worm wheel by a worm formed on an outer circumferential surface thereof to be engaged with the worm wheel. The worm wheel may linearly move the drive shaft 1390 by being connected to and engaged with the drive shaft 1390, and the drive shaft 1390 is connected to the hydraulic piston 1320 so that the hydraulic piston 1320 may be slidably moved within the cylinder block 1310.

Explaining the above operations again, when the displacement of the brake pedal 10 is detected by the pedal displacement sensor 11, the detected signal is transferred to the electronic control unit, and the electronic control unit drives the motor to rotate the worm shaft in one direction. The rotational force of the worm shaft is transferred to the drive shaft 1390 via the worm wheel, and the hydraulic piston 1320 connected to the drive shaft 1390 moves forward in the cylinder block 1310, thereby generating a hydraulic pressure in the first pressure chamber 1330.

Conversely, when the pressing force of the brake pedal 10 is released, the electronic control unit drives the motor to rotate the worm shaft in the opposite direction. Accordingly, the worm wheel also rotates in the opposite direction, and the hydraulic piston 1320 connected to the drive shaft 1390 moves backward in the cylinder block 1310, thereby generating a negative pressure in the first pressure chamber 1330.

The generation of a hydraulic pressure and negative pressure in the second pressure chamber 1340 may be implemented by operating opposite to the above operations. That is, when the displacement of the brake pedal 10 is detected by the pedal displacement sensor 11, the detected signal is transferred to the electronic control unit, and the electronic control unit drives the motor to rotate the worm shaft in the opposite direction. The rotational force of the worm shaft is transferred to the drive shaft 1390 via the worm wheel, and the hydraulic piston 1320 connected to the drive shaft 1390 moves backward within the cylinder block 1310, thereby generating a hydraulic pressure in the second pressure chamber 1340.

Conversely, when the pressing force of the brake pedal 10 is released, the electronic control unit drives the motor to rotate the worm shaft in one direction. Accordingly, the worm wheel also rotates in one direction, and the hydraulic piston 1320 connected to the drive shaft 1390 moves forward in the cylinder block 1310, thereby generating a negative pressure in the second pressure chamber 1340.

As such, the hydraulic pressure providing unit 1300 may generate a hydraulic pressure or negative pressure in the first pressure chamber 1330 and the second pressure chamber 1340, respectively, depending on the rotation direction of the worm shaft by the operation of the motor, and whether a hydraulic pressure is transferred to the chambers to perform braking, or whether a negative pressure is generated in the chambers to release braking may be determined by controlling the valves. A detailed description thereof will be described below.

The power conversion unit according to the present embodiment is not limited to any one structure as long as it may convert the rotational motion of the motor into the linear motion of the hydraulic piston 1320, and may include devices having various structures and manners.

The hydraulic pressure providing unit 1300 may be hydraulically connected to the reservoir 1100 by the dump controller 1800. The dump controller 1800 may include a dump flow path 1810 connecting the first pressure chamber 1330 and the reservoir 1100, and a bypass flow path 1820 that is branched from the dump flow path 1810 and rejoins the dump flow path 1810.

A dump check valve 1811 and a dump valve 1821 for controlling the flow of the pressurized medium may be provided in the dump flow path 1810 and the bypass flow path 1820, respectively. The dump check valve 1811 may be provided to allow only the flow of the pressurized medium from the reservoir 1100 toward the first pressure chamber 1330 and block the flow of the pressurized medium in the opposite direction. The bypass flow path 1820 is connected in parallel with respect to the dump check valve 1811 in the dump flow path 1810, and the dump valve 1821 for controlling the flow of the pressurized medium between the first pressure chamber 1330 and the reservoir 1100 may be provided in the bypass flow path 1820. In other words, the bypass flow path 1820 may bypass the dump check valve 1811 on the dump flow path 1810 to connect a front side and a rear side of the dump check valve 1811, and the dump valve 1821 may be provided as a bidirectional solenoid valve for controlling the flow of the pressurized medium between the first pressure chamber 1330 and the reservoir 1100. The dump valve 1821 may be provided as a normally closed type solenoid valve that operates to be opened when an electric signal is received from the electronic control unit in a normally closed state.

The hydraulic pressure control unit 1400 may be provided to control a hydraulic pressure transferred to the respective wheel cylinders 21, 22, 23, and 24, and the electronic control unit (ECU) is provided to control the hydraulic pressure providing unit 1300 and various valves based on the hydraulic pressure information and pedal displacement information.

The hydraulic pressure control unit 1400 may include a first hydraulic circuit 1510 for controlling the flow of the hydraulic pressure to be transferred to first and second wheel cylinders 21 and 22 among the four wheel cylinders 21, 22, 23, and 24, and a second hydraulic circuit 1520 for controlling the flow of the hydraulic pressure to be transferred to third and fourth wheel cylinders 23 and 24, and includes a plurality of flow paths and valves to control the hydraulic pressure to be transferred from the hydraulic pressure providing unit 1300 to the wheel cylinders 21, 22, 23, and 24.

The first hydraulic flow path 1401 is provided to be in communication with the first pressure chamber 1330 and may be branched into a second hydraulic flow path 1402 and a third hydraulic flow path 1403. Also, the fourth hydraulic flow path 1404 is provided to be in communication with the second pressure chamber 1340, a fifth hydraulic flow path 1405 is provided to connect the first hydraulic flow path 1401 to the fourth hydraulic flow path 1404, and a sixth hydraulic flow path 1406 is provided to be branched from the first hydraulic flow path 1401 to be connected to the fifth hydraulic flow path 1405.

The second hydraulic flow path 1402 and the third hydraulic flow path 1403 branched from the first hydraulic flow path 1401 are provided to be connected to the first hydraulic circuit and the second hydraulic circuit, respectively. A first valve 1411 for controlling the flow of the pressurized medium may be provided in the first hydraulic flow path 1401. The first valve 1411 may be provided as a check valve for allowing the flow of the pressurized medium from the first pressure chamber toward the first and second hydraulic circuits 1510 and 1520, while blocking the flow of the pressurized medium in the opposite direction. Also, a second valve 1412 for controlling the flow of the pressurized medium may be provided in the sixth hydraulic flow path 1406, and the second valve 1412 may be provided as a bidirectional control valve for controlling the flow of the pressurized medium. The second valve 1412 may be provided as a normally closed type solenoid valve that operates to be opened when an electric signal is received from the electronic control unit in a normally closed state.

By the arrangement of the hydraulic flow paths and valves of the hydraulic pressure control unit 1400 as described above, the hydraulic pressure generated in the first pressure chamber 1330 according to the forward movement of the hydraulic piston 1320 may be transferred to the first hydraulic circuit 1510 by sequentially passing through the first hydraulic flow path 1401 and the second hydraulic flow path 1402, and may be transferred to the second hydraulic circuit 1520 by sequentially passing through the first hydraulic flow path 1401 and the third hydraulic flow path 1403. Also, the hydraulic pressure formed in the second pressure chamber 1340 according to the backward movement of the hydraulic piston 1320 may be transferred to the first hydraulic circuit 1510 by sequentially passing through the fourth hydraulic flow path 1404, the fifth hydraulic flow path 1405, and the second hydraulic flow path 1402, and may be transferred to the second hydraulic circuit 1520 by sequentially passing through the fourth hydraulic flow path 1404, the fifth hydraulic flow path 1405, and the third hydraulic flow path 1403.

Conversely, the negative pressure generated in the first pressure chamber 1330 according to the backward movement of the hydraulic piston 1320 may recover the pressurized medium provided in the first hydraulic circuit 1510 to the first pressure chamber 1330 by sequentially passing through the second hydraulic flow path 1402, the sixth hydraulic flow path 1406, and the first hydraulic flow path 1401, and may recover the pressurized medium provided in the second hydraulic circuit 1520 to the first pressure chamber 1330 by sequentially passing through the third hydraulic flow path 1403, the sixth hydraulic flow path 1406, and the first hydraulic flow path 1401. Also, the negative pressure generated in the second pressure chamber 1340 according to the forward movement of the hydraulic piston 1320 may recover the pressurized medium provided in the first hydraulic circuit 1510 to the second pressure chamber 1340 by sequentially passing through the second hydraulic flow path 1402, the fifth hydraulic flow path 1405, and the fourth hydraulic flow path 1404, and may recover the pressurized medium provided in the second hydraulic circuit 1520 to the second pressure chamber 1340 by sequentially passing through the third hydraulic flow path 1403, the fifth hydraulic flow path 1405, and the fourth hydraulic flow path 1404.

In addition, the negative pressure generated in the first pressure chamber 1330 according to the backward movement of the hydraulic piston 1320 may supply the pressurized medium from the reservoir 1100 to the first pressure chamber 1330 through the dump flow path 1810.

A detailed description of the transfer of the hydraulic pressure and negative pressure by the arrangement of these hydraulic flow paths and valves will be described below with reference to FIGS. 2 to 5.

The first hydraulic circuit 1510 of the hydraulic pressure control unit 1400 may control the hydraulic pressure in the first wheel cylinder 21 and the second wheel cylinder 22, which are two wheel cylinders 21, 22, 23, and 24 among the four wheels RR, RL, FR, and FL, and the second hydraulic circuit 1520 may control the hydraulic pressure in the third and fourth wheel cylinders 23 and 24 which are the other two wheel cylinders 21, 22, 23, and 24.

The first hydraulic circuit 1510 may receive the hydraulic pressure through the second hydraulic flow path 1402 from the hydraulic pressure providing unit 1300, and the second hydraulic flow path 1402 may be provided to be branched into two flow paths, which are connected to the first wheel cylinder 21 and the second wheel cylinder 22. Similarly, the second hydraulic circuit 1520 may receive the hydraulic pressure through the third hydraulic flow path 1403 from the hydraulic pressure providing unit 1300, and the third hydraulic flow path 1403 may be provided to be branched into two flow paths, which are connected to the third wheel cylinder 23 and the fourth wheel cylinder 24.

The first and second hydraulic circuits 1510 and 1520 may include first to fourth inlet valves 1511a, 1511b, 1521a, and 1521b, respectively, to control the flow and hydraulic pressure of the pressurized medium to be transferred to the first to fourth wheel cylinders 21 to 24. The first to fourth inlet valves 1511a, 1511b, 1521a, and 1521b are disposed on upstream sides of the first to fourth wheel cylinders 21, 22, 23, and 24, respectively, and may be provided as a normally open type solenoid valve that operates to be closed when an electric signal is received from the electronic control unit in a normally open state.

The first and second hydraulic circuits 1510 and 1520 may include first to fourth check valves 1513a, 1513b, 1523a, and 1523b provided to be connected in parallel with respect to the first to fourth inlet valves 1511a, 1511b, 1521a, and 1521b. The check valves 1513a, 1513b, 1523a, and 1523b may be provided in the bypass flow paths that connect front sides and rear sides of the first to fourth inlet valves 1511a, 1511b, 1521a, and 1521b on the first and second hydraulic circuits 1510 and 1520, and may allow only the flow of pressurized medium from each of the wheel cylinders 21, 22, 23, and 24 to the hydraulic pressure providing unit 1300, while blocking the flow of the pressurized medium from the hydraulic pressure providing unit 1300 to the wheel cylinders 21, 22, 23, and 24. By the first to fourth check valves 1513a, 1513b, 1523a, and 1523b, the hydraulic pressure of the pressurized medium applied to each of the wheel cylinders 21, 22, 23, and 24 may be quickly released, and even when the first to fourth inlet valves 1511a, 1511b, 1521a, and 1521b do not operate normally, the hydraulic pressure of the pressurized medium applied to the wheel cylinders 21, 22, 23, and 24 may be smoothly returned to the hydraulic pressure providing unit.

The first and second wheel cylinders 21 and 22 of the first hydraulic circuit 1510 may be connected to flow paths branched from the backup flow path 1610, which will be described below, and the backup flow path 1610 may be provided with at least one cut valve 1611 for controlling the flow of the pressurized medium between the first and second wheel cylinders 21 and 22 (further, the third and fourth wheel cylinders 23 and 24) and the integrated master cylinder 1200.

The second hydraulic circuit 1520 may include first and second outlet valves 1522a and 1522b for controlling the flow of the pressurized medium discharged from the third and fourth wheel cylinders 23 and 24 to improve performance when braking of the third and fourth wheel cylinders 23 and 24 is released. The first and second outlet valves 1522a and 1522b are provided on discharge sides of the third and fourth wheel cylinders 23 and 24, respectively, to control the flow of the pressurized medium transferred from the third and fourth wheel cylinders 23 and 24 to the reservoir 1100. The first and second outlet valves 1522a and 1522b may be provided as normally closed type solenoid valves that operate to be opened when an electric signal is received from the electronic control unit in a normally closed state. In an ABS braking mode of the vehicle, the first and second outlet valves 1522a and 1522b may selectively release the hydraulic pressure of the pressurized medium applied to the first and second wheel cylinders 21 and 22 and transfer the released hydraulic pressure of the pressurized medium to the reservoir 1100 side.

The electronic brake system 1000 according to the present embodiment may include the backup flow paths 1610 to implement braking by directly supplying the pressurized medium discharged from the integrated master cylinder 1200 to the wheel cylinders 21, 22, 23, and 24 when the normal operation is impossible due to a device failure or the like. A mode in which the hydraulic pressure in the integrated master cylinder 1200 is directly transferred to the wheel cylinders 21, 22, 23, and 24 is referred to as an abnormal operation mode, that is, a fallback mode.

The backup flow path 1610 may be provided to connect the simulation chamber 1220a of the integrated master cylinder 1200 to the first hydraulic circuit 1510, and further to the second hydraulic circuit 1520. Specifically, the backup flow path 1610 may have one end connected to the simulation chamber 1220a and the other end connected between the first inlet valve 1511a and the cut valve 1611 on the first hydraulic circuit 1510. Although FIG. 1 illustrates that the backup flow path 1610 is connected between the first inlet valve 1511a and the cut valve 1611, the same structure may be provided when the first backup flow path 1610 is branched and connected to at least one of upstream sides of the cut valve 1611.

The cut valve 1611 is a valve for controlling bidirectional flows of the pressurized medium, and may be provided as normally open type solenoid valves that operate to be closed when a closing signal is received from the electronic control unit in a normally open state.

As illustrated in FIG. 1, a pair of the cut valves 1611 may be provided on the first wheel cylinder 21 and the second wheel cylinder 22, respectively, and may selectively release the hydraulic pressure of the pressurized medium applied to the first wheel cylinder 21 and the second wheel cylinder 22 in the ABS braking mode of the vehicle so that the released hydraulic pressure of the pressurized medium may be discharged to the reservoir 1100 side by sequentially passing through the backup flow path 1610, the simulation chamber 1220a, and the simulation flow path 1260. Accordingly, when the cut valves 1611 are closed, the pressurized medium in the integrated master cylinder 1200 may be prevented from being directly transferred to the wheel cylinders 21, 22, 23, and 24, and at the same time the hydraulic pressure provided from the hydraulic pressure providing unit 1300 may be supplied to the first and second hydraulic circuits 1510 and 1520 side through the hydraulic pressure control unit 1400, and when the cut valves 1611 and the inspection valve 1621 are opened, the pressurized medium pressurized in the integrated master cylinder 1200 may be directly supplied to the first and second hydraulic circuits 1510 and 1520 side through the backup flow paths 1610, thereby performing braking.

The electronic brake system 1000 according to the present embodiment may include a pressure sensor PS2 to detect a hydraulic pressure in at least one of the first hydraulic circuit 1510 and the second hydraulic circuit 1520. The drawing illustrates that the pressure sensor PS2 is provided in the first hydraulic circuit 1510 side, but the pressure sensor is not limited to the above position and number, and as long as the hydraulic pressures in the hydraulic circuits and the integrated master cylinder 1200 may be detected, the pressure sensor may be provided in various positions and in various numbers.

Hereinafter, operation methods of the electronic brake system 1000 according to the first embodiment of the present disclosure will be described.

The operation of the electronic brake system 1000 according to the present embodiment may include the normal operation mode in which various devices and valves operate normally without failure or malfunction, the abnormal operation mode (fallback mode) in which various devices and valves operate abnormally by failure or malfunction, and the inspection mode of inspecting whether a leak occurs in the integrated master cylinder 1200 or the simulation valve 1261.

First, the normal operation mode among the operating methods of the electronic brake system 1000 according to the present embodiment will be described.

The normal operation mode of the electronic brake system 1000 according to the present embodiment may be divided into a first braking mode and a second braking mode as the hydraulic pressure transferred from the hydraulic pressure providing unit 1300 to the wheel cylinders 21, 22, 23, and 24 increases. Specifically, in the first braking mode, the hydraulic pressure by the hydraulic pressure providing unit 1300 may be primarily provided to the wheel cylinders 21, 22, 23, and 24, and in the second braking mode, the hydraulic pressure by the hydraulic pressure providing unit 1300 may be secondarily provided to the wheel cylinders 21, 22, 23, and 24 to transfer a higher braking pressure than in the first braking mode.

The first and second braking modes may be changed by changing the operations of the hydraulic pressure providing unit 1300 and the hydraulic pressure control unit 1400. The hydraulic pressure providing unit 1300 may provide a sufficiently high hydraulic pressure of the pressurized medium without a high specification motor 120 by utilizing the first and second braking modes, and furthermore, may prevent unnecessary loads applied to the motor. Therefore, a stable braking force may be secured while reducing the cost and weight of the brake system, and durability and operational reliability of the devices may be improved.

FIG. 2 is a hydraulic circuit diagram illustrating that the electronic brake system 1000 according the present disclosure performs the first braking mode.

Referring to FIG. 2, when the driver depresses the brake pedal 10 at the beginning of braking, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 21, 22, 23, and 24 through the hydraulic pressure control unit 1400, the first hydraulic circuit 1510 and the second hydraulic circuit 1520, thereby generating a braking force.

Specifically, a part of the hydraulic pressure generated in the first pressure chamber 1330 is primarily transferred to the first wheel cylinder 21 and the second wheel cylinder 22 provided in the first hydraulic circuit 1510 by sequentially passing through the first hydraulic flow path 1401 and the second hydraulic flow path 1402. In this case, as the first valve 1411 is provided as a check valve for allowing only the flow of the pressurized medium from the first pressure chamber 1330 toward the first and second hydraulic circuits 1510 and 1520, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in an open state, and the cut valve 1611 is maintained in a closed state, thereby preventing the hydraulic pressure of the pressurized medium from leaking into the backup flow path 1610 side.

The hydraulic pressure generated in the first pressure chamber 1330 is primarily transferred to the third and fourth wheel cylinders 23 and 24 provided in the second hydraulic circuit 1520 by sequentially passing through the first hydraulic flow path 1401 and the third hydraulic flow path 1403. As described above, as the second valve 1412 is provided as a check valve for allowing only the flow of the pressurized medium discharged from the first pressure chamber 1330 toward the first and second hydraulic circuits 1510 and 1520, the hydraulic pressure of the pressurized medium may be smoothly transferred to the third and fourth wheel cylinders 23 and 24. Also, the third inlet valve 1521a and the fourth inlet valve 1521b provided in the second hydraulic circuit 1520 are maintained in an open state, and the first and second outlet valves 1522a and 1522b are maintained in a closed state, thereby preventing the hydraulic pressure of the pressurized medium from leaking into the reservoir 1100 side.

In the first braking mode, a part of the hydraulic pressure of the pressurizing medium generated in the first pressure chamber 1330 may be supplied to the second pressure chamber 1340. As the hydraulic piston 1320 moves forward to generate a hydraulic pressure in the first braking mode, a part of the pressurization medium accommodated in the first pressure chamber 1330 is supplied to and filled in the second pressure chamber 1340, so that the second braking mode, which will be described below, may be prepared. To this end, in the first braking mode, the second valve 1412 is operated to open, so that the flow of the pressurized medium through the sixth hydraulic flow path 1406 and the fifth hydraulic flow path 1405 may be allowed. In other words, a part of the hydraulic pressure generated in the first pressure chamber 1330 may be supplied to the second pressure chamber 1340 by sequentially passing through the first hydraulic flow path 1401, the sixth hydraulic flow path 1406, the fifth hydraulic flow path 1405, and the fourth hydraulic flow path 1404.

The dump valve 1821 provided in the bypass flow path 1820 is maintained in a closed state, thereby preventing the hydraulic pressure of the pressurized medium generated in the first pressure chamber 1330 from leaking into the reservoir 1100 side.

In the first braking mode in which braking of the wheel cylinders 21, 22, 23, and 24 is performed by the hydraulic pressure providing unit 1300, the cut valve 1611 provided in the backup flow path 1610 is switched to be closed, so that the pressurized medium discharged from the integrated master cylinder 1200 is prevented from being transferred to the wheel cylinders 21, 22, 23, and 24 side.

Specifically, as a pressing force is applied to the brake pedal 10, the pressurized medium accommodated in the simulation chamber 1220a is pressurized to generate a hydraulic pressure, the hydraulic pressure of the pressurized medium generated in the simulation chamber 1220a is transferred to the front surface (right side of FIG. 2) of the simulation piston 1220, and because the simulator valve 1261 is opened in the normal operation mode, a displacement occurs in the simulation piston 1220. On the other hand, because the inspection valve 1621 is closed in the normal operation mode of the electronic brake system 1000, the master chamber 1230a is sealed so that no displacement occurs in master piston 1230, and thus the elastic member 1240 is compressed by the displacement of the simulation piston 1220, and the elastic restoring force by the compression of the elastic member 1240 is provided to the driver as a pedal feeling. In this case, the pressurized medium accommodated in the simulation chamber 1220a is discharged to the reservoir 1100 through the simulation flow path 1260.

The electronic brake system 1000 according to the present embodiment may switch from the first braking mode to the second braking mode shown in FIG. 3 when a braking pressure higher than that in the first braking mode is to be provided.

FIG. 3 is a hydraulic circuit diagram illustrating that the electronic brake system 1000 according to the present embodiment performs the second braking mode, and referring to FIG. 3, when a displacement or an operating speed of the brake pedal 10 detected by the pedal displacement sensor 11 is higher than a preset level or a hydraulic pressure detected by the pressure sensor is higher than a preset level, the electronic control unit may switch from the first braking mode to the second braking mode by determining that a higher braking pressure is required.

When the first braking mode is switched to the second braking mode, the motor operates to rotate in the other direction, and the rotational force of the motor is transferred to the hydraulic pressure providing unit by the power conversion unit so that the hydraulic piston 1320 moves backward, thereby generating a hydraulic pressure in the second pressure chamber 1340. The hydraulic pressure discharged from the second pressure chamber 1340 is transferred to the respective wheel cylinders 21, 22, 23, and 24 through the hydraulic pressure control unit 1400, the first hydraulic circuit 1510, and the second hydraulic circuit 1520, thereby generating a braking force.

Specifically, the hydraulic pressure generated in the second pressure chamber 1340 is secondarily transferred to the first wheel cylinder 21 and the second wheel cylinder 22 provided in the first hydraulic circuit 1510 by sequentially passing through the fourth hydraulic flow path 1404, the fifth hydraulic flow path 1405, and the second hydraulic flow path 1402. The first inlet valve 1511a and the second inlet valve 1511b provided in the first hydraulic circuit 1510 are maintained in the open state, and the cut valve 1611 is maintained in the closed state, thereby preventing the hydraulic pressure of the pressurized medium from leaking into the backup flow path 1610 side.

Also, the hydraulic pressure generated in the second pressure chamber 1340 is secondarily transferred to the third wheel cylinder 23 and the fourth wheel cylinder 24 provided in the second hydraulic circuit 1520 by sequentially passing through the fourth hydraulic flow path 1404, the fifth hydraulic flow path 1405, and the third hydraulic flow path 1403. The third inlet valve 1521a and the fourth inlet valve 1521b provided in the second hydraulic circuit 1520 are maintained in the open state, and the first and second outlet valves 1522a and 1522b are maintained in the closed state, thereby preventing the hydraulic pressure of the pressurized medium from leaking into the reservoir 1100 side.

In the second braking mode, as the second valve 1412 provided in the sixth hydraulic flow path 1406 is switched to a closed state, the hydraulic pressure of the pressurized medium generated in the second pressure chamber 1340 may be prevented from leaking into the first pressure chamber 1330, and the first pressure chamber 1330 may be filled with the pressurized medium supplied from the reservoir 1100 through the dump flow path 1810. In this case, the dump valve 1821 provided in the bypass flow path 1820 is switched to an open state as necessary, so that the flow of the pressurized medium from the reservoir 1100 toward the first pressure chamber 1330 may be allowed.

Hereinafter, an operation method of the electronic brake system 1000 according to the present embodiment in which the braking is released from the normal operation mode will be described.

FIG. 4 is a hydraulic circuit diagram illustrating that the hydraulic piston 1320 of the electronic brake system 1000 according to the present embodiment moves forward to release the second braking mode.

Referring to FIG. 4, when the pressing force applied to the brake pedal 10 is released, the motor generates a rotational force in one direction and transfers the rotational force to the power conversion unit, and the power conversion unit moves the hydraulic piston 1320 forward. Accordingly, the hydraulic pressure in the first pressure chamber 140 is released, and at the same time, a negative pressure may be generated, so that the pressurized medium in the wheel cylinders 21, 22, 23, and 24 may be transferred to the second pressure chamber 1340.

Specifically, the hydraulic pressure of the pressurized medium applied to the first wheel cylinder 21 and the second wheel cylinder 22 provided in the first hydraulic circuit 1510 is recovered to the second pressure chamber 1340 by sequentially passing through the second hydraulic flow path 1402, the first hydraulic flow path 1401, the fifth hydraulic flow path 1405, and the fourth hydraulic flow path 1404. In this case, the second valve 1412 is closed to prevent the recovered pressurized medium from leaking into the first pressure chamber 1330. Also, the first inlet valve 1511a and the second inlet valve 1511b provided in the first hydraulic circuit 1510 are maintained in the open state, and the cut valve 1611 is maintained in the closed state.

Also, the hydraulic pressure of the pressurized medium applied to the third wheel cylinder 23 and the fourth wheel cylinder 24 provided in the second hydraulic circuit 1520 by the negative pressure generated in the second pressure chamber 1340 is recovered to the second pressure chamber 1340 by sequentially passing through the third hydraulic flow path 1403, the first hydraulic flow path 1401, the fifth hydraulic flow path 1405, and the fourth hydraulic flow path 1404. The third inlet valve 1521a and the fourth inlet valve 1521b provided in the second hydraulic circuit 1520 are provided in the open state, and the first and second outlet valves 1522a and 1522b are maintained in a closed state. When the second braking mode is released, the dump valve 1821 may be opened to smoothly implement the forward movement of the hydraulic piston 1320.

After the releasing of the second braking mode is completed, it may be switched to the releasing operation of the first braking mode illustrated in FIG. 5 in order to completely release the braking pressure applied to the wheel cylinders 21, 22, 23, and 24.

FIG. 5 is a hydraulic circuit diagram illustrating that the hydraulic piston 1320 of the electronic brake system 1000 according to the present embodiment moves backward to release the first braking mode.

Referring to FIG. 5, when the pressing force applied to the brake pedal 10 is released, the motor generates a rotational force in the other direction and transfers the rotational force to the power conversion unit, and the power conversion unit moves the hydraulic piston 1320 backward. Accordingly, a negative pressure may be generated in the first pressure chamber 1330, so that the pressurized medium in the wheel cylinders 21, 22, 23, and 24 may be transferred to the first pressure chamber 1330.

Specifically, the hydraulic pressure in the first and second wheel cylinders 21 and 22 provided in the first hydraulic circuit 1510 is recovered to the first pressure chamber 1330 by sequentially passing through the second hydraulic flow path 1402, the fifth hydraulic flow path 1405, the sixth hydraulic flow path 1406, and the first hydraulic flow path 1401. In this case, the second valve 1416 is opened to allow the flow of the pressurized medium through the sixth hydraulic flow path 1406, and the dump valve 1821 is closed to effectively generate a negative pressure in the first pressure chamber 1330. In addition, in order to enable the hydraulic piston 1320 to quickly and smoothly move backward, the pressurized medium accommodated in the second pressure chamber 1340 is transferred to the first pressure chamber 1330 by sequentially passing through the fourth hydraulic flow path 1404, the fifth hydraulic flow path 1405, the sixth hydraulic flow path 1406, and the first hydraulic flow path 1401. The first inlet valve 1511*a* and the second inlet valve 1511*b* provided in the first hydraulic circuit 1510 are maintained in the open state, and the cut valve 1611 is maintained in the closed state.

Also, the hydraulic pressure of the pressurized medium applied to the third wheel cylinder 23 and the fourth wheel cylinder 24 provided in the second hydraulic circuit 1520 by the negative pressure generated in the first pressure chamber 1330 is recovered to the first pressure chamber 1330 by sequentially passing through the third hydraulic flow path 1403, the fifth hydraulic flow path 1405, the sixth hydraulic flow path 1406, and the first hydraulic flow path 1401. The third inlet valve 1521*a* and the fourth inlet valve 1521*b* provided in the second hydraulic circuit 1520 are maintained in the open state, and the first and second outlet valves 1522*a* and 1522*b* are maintained in the closed state.

Hereinafter, an operation method in a case where the electronic brake system 1000 according to the present embodiment does not operate normally, that is, in the fallback mode will be described.

FIG. 6 is a hydraulic circuit diagram illustrating the operation of the electronic brake system 1000 according to the present embodiment in the abnormal operation mode (fallback mode) when a normal operation is impossible due to a device failure or the like.

Referring to FIG. 6, in the abnormal operation mode, each of the valves is controlled to an initial braking state which is a non-operational state. In this case, when the driver depresses the brake pedal 10, the simulation piston 1220 connected to the brake pedal 10 moves forward to generate a displacement. Because the cut valve 1611 is opened in the non-operational state, the forward movement of the simulation piston 1220 may cause the pressurized medium accommodated in the simulation chamber 1220*a* to be transferred to the first wheel cylinder 21 and the second wheel cylinder 22 of the first hydraulic circuit 1510 along the backup flow path 1610, thereby performing braking. In this case, because the simulator valve 1261 of the simulation flow path 1260 is provided in a closed state in the non-operational state, the pressurized medium accommodated in the simulation chamber 1220*a* may be transferred to the backup flow path 1610 without being discharged to the reservoir 1100, and at the same time, may generate a hydraulic pressure for moving the master piston 1230 forward. In addition, since the inspection valve is opened so that the master chamber 1230*a* and the first hydraulic circuit 1510 may communicate with each other, the displacement of the simulation piston 1220 causes the master piston 1230 also to move forward so that a displacement occurs in the master piston 1230. Accordingly, the pressurized medium accommodated in the master chamber 1230*a* may be provided to the first hydraulic circuit 1510 by sequentially passing through the auxiliary backup flow path 1620 and the backup flow path 1610. Furthermore, the pressurized medium transferred to the first hydraulic circuit 1510 may be transferred to the third wheel cylinder 23 and the fourth wheel cylinder 24 of the second hydraulic circuit 1520 along the second hydraulic flow path 1402 and the third hydraulic flow path 1403, thereby performing braking.

Hereinafter, the inspection mode of an electronic brake system 1000 according to the first embodiment of the present disclosure will be described.

FIG. 7 is a hydraulic circuit diagram illustrating the inspection mode of the electronic brake system 1 according to the first embodiment of the present disclosure performs, and referring to FIG. 7, the electronic brake system 1000 according to the present embodiment may perform the inspection mode of inspecting whether the integrated master cylinder 1200 or the simulator valve 1261 has a leak. When the inspection mode is performed, the electronic control unit controls to supply the hydraulic pressure generated from the hydraulic pressure providing unit 1300 to the simulation chamber 1220 of the integrated master cylinder 1200.

Specifically, in a state in which each of the valves is controlled to the initial braking state, which is a non-operational state, the electronic control unit operates to move the hydraulic piston 1320 forward, so that a hydraulic pressure is generated in the first pressure chamber 1330, the simulator valve 1261 is switched to a closed state, and the cut valve 1611 is maintained in the open state. Accordingly, the hydraulic pressure generated in the first pressure chamber 1330 is transferred to the first hydraulic circuit 1510 side by sequentially passing through the first hydraulic flow path 1401 and the second hydraulic flow path 1402, and because the first inlet valve 1511*a* and the second inlet valve 1511*b* are maintained in a normally open state, the pressurized medium transferred to the first hydraulic circuit 1510 is introduced into the simulation chamber 1220*a* through the backup flow path 1610. In this case, the inspection valve 1621 is maintained in the closed state to induce the simulation chamber 1220*a* to be in a sealed state.

In order to quickly perform the inspection mode, the third inlet valve 1521*a* and the fourth inlet valve 1521*b* provided in the second hydraulic circuit 1520 may be switched to the closed state.

In this state, an expected hydraulic pressure value of the pressurized medium to be generated by the displacement of the hydraulic piston 1320 is compared with a hydraulic pressure value in the simulation chamber 1220*a* measured by the pressure sensor PS1 or in the first hydraulic circuit 1510 measured by the pressure sensor PS2, so that a leak in the integrated master cylinder 1200 or the simulator valve 1261 may be diagnosed. Specifically, the expected hydraulic pressure value calculated based on a displacement amount of the hydraulic piston 1320 or a rotation angle measured by a motor control sensor (not shown) is compared with an actual hydraulic pressure value measured by the pressure sensor PS1 or PS2, and when the two hydraulic pressure values match, it may be determined that there is no leak in the integrated master cylinder 1200 or the simulator valve 1261. On the other hand, when the actual hydraulic pressure value measured by the pressure sensor PS1 or PS2 is lower than the expected hydraulic pressure value calculated based on the displacement amount of the hydraulic piston 1320 or the rotation angle measured by the motor control sensor (not shown), because this is due to the loss of a part of the hydraulic pressure of the pressurized medium applied to the simulation chamber 1220*a*, it is determined that there is a leak in the integrated master cylinder 1200 or the simulator valve 1261, and this leak may be notified to the driver.

Hereinafter, an electronic brake system 2000 according to a second embodiment of the present disclosure will be described.

FIG. 8 is a hydraulic circuit diagram illustrating the electronic brake system 2000 according to the second embodiment of the present disclosure. Because except for additional explanations with separate reference numerals, the following description of the electronic brake system 2000 according to the second embodiment of the present disclosure is the same as the above description of the electronic brake system 1000 according to the first embodiment of the present disclosure, in order to prevent redundant description, a description thereof will be omitted.

Referring to FIG. 8, a hydraulic pressure control unit 2400 according to the second embodiment of the present disclosure may further include a third valve 2413 provided in the fourth hydraulic flow path 1404 to control the flow of the pressurized medium. The third valve 2413 may be provided as a bidirectional control valve for controlling the flow of the pressurized medium. The third valve 2413 may be provided as a normally open type solenoid valve that operates to be closed when an electric signal is received from the electronic control unit in a normally open state. For example, the third valve 2413 is provided in the fourth hydraulic flow path 1404 communicating with the second pressure chamber 1340, so that when a leak occurs in the second pressure chamber 1340, the third valve 2413 is provided to be switched to be closed, thereby preventing a leak described above.

Hereinafter, operation methods of the electronic brake system 2000 according to the second embodiment of the present disclosure will be described.

In the first braking mode during the normal operation mode of the electronic brake system 2000 according to the present embodiment, a part of the hydraulic pressure formed in the first pressure chamber 1330 is transferred to the second pressure chamber 1340 by sequentially passing through the first hydraulic flow path 1401, the sixth hydraulic flow path 1406, the fifth hydraulic flow path 1405, and the fourth hydraulic flow path 1404, and to this end, the second valve 1412 provided in the sixth hydraulic flow path 1406 and the third valve 2413 provided in the fifth hydraulic flow path 1405 are opened.

In the second braking mode, the third valve 1416 is maintained in the open state to allow the flow of the pressurized medium through the fifth hydraulic flow path 1405, and the second valve 1412 provided in the sixth hydraulic flow path 1406 is switched to be closed to prevent the hydraulic pressure of the pressurized medium formed in the second pressure chamber 1340 from leaking into the first pressure chamber 1330.

In a releasing of the second braking mode, the third valve 2413 is opened to allow the flow of the pressurized medium through the fifth hydraulic flow path 1405, and the second valve 1412 provided in the sixth hydraulic flow path 1406 is closed to prevent the recovered pressurized medium from leaking into the first pressure chamber 1330.

In a releasing of the first braking mode, the pressurized medium accommodated in the second pressure chamber 1340 is transferred to the first pressure chamber 1330 by sequentially passing through the fourth hydraulic flow path 1404, the fifth hydraulic flow path 1405, the sixth hydraulic flow path 1406, and the firth hydraulic flow path 1401 so as to promote the rapid and smooth backward movement of the hydraulic piston 1320. To this end, the second valve 1412 provided in the sixth hydraulic flow path 1406 is switched to be open, and the third valve 2413 provided in the fifth hydraulic flow path 1405 is maintained in an open state.

Among the operation methods of the electronic brake system 2000 according to the second embodiment of the present disclosure, the abnormal operation mode and the inspection mode are the same as the operation methods of the electronic brake system 1000 according to the first embodiment described above, so the description will be omitted.

The invention claimed is:

1. An electronic brake system comprising:
a reservoir in which a pressurized medium is stored;
an integrated master cylinder including a simulation chamber, a simulation piston provided in the simulation chamber to be displaceable by a brake pedal, a master chamber, a master piston provided in the master chamber to be displaceable by a displacement of the simulation piston or a hydraulic pressure of the simulation chamber, an elastic member provided between the simulation piston and the master piston, a piston spring elastically supporting the master piston, a simulation flow path connecting the simulation chamber to the reservoir, and a simulator valve provided in the simulation flow path to control a flow of a pressurized medium;
a hydraulic pressure providing unit provided to generate a hydraulic pressure by operating a hydraulic piston according to an electrical signal output in response to a displacement of the brake pedal;
a hydraulic pressure control unit including a first hydraulic circuit provided to control the hydraulic pressure to be transferred to two wheel cylinders, and a second hydraulic circuit provided to control the hydraulic pressure to be transferred to other two wheel cylinders;
an electronic control unit configured to control valves based on hydraulic pressure information and displacement information of the brake pedal;
a backup flow path connecting the simulation chamber to the first hydraulic circuit;
an auxiliary backup flow path connecting the master chamber to the backup flow path; and
an inspection valve provided in the auxiliary backup flow path to control a flow of the pressurized medium.

2. The electronic brake system according to claim 1, wherein the hydraulic pressure providing device comprises:
a first pressure chamber provided on one side of the hydraulic piston movably accommodated in a cylinder block to be connected to one or more of the wheel cylinders; and a second pressure chamber provided on an other side of the hydraulic piston to be connected to one or more of the wheel cylinders, and
wherein the hydraulic pressure control unit comprises:
a first hydraulic flow path in communication with the first pressure chamber; a second hydraulic flow path branched from the first hydraulic flow path to be connected to the first hydraulic circuit; a third hydraulic flow path branched from the first hydraulic flow path to be connected to the second hydraulic circuit; a fourth hydraulic flow path in communication with the second pressure chamber; a fifth hydraulic flow path connecting the first hydraulic flow path to fourth hydraulic flow path; and a sixth hydraulic flow path branched from the first hydraulic flow path to be connected to the fifth hydraulic flow path.

3. The electronic brake system according to claim 2, wherein the hydraulic pressure control unit includes a first vale provided in the first hydraulic flow path to control a flow of the pressurized medium and a second vale provided in the sixth hydraulic flow path to control a flow of the pressurized medium.

4. The electronic brake system according to claim 3, wherein
the first valve is provided as a check valve for allowing only a flow of the pressurized medium discharged from the first pressure chamber, and
the second valve is provided as a solenoid valve for controlling bidirectional flows of the pressurized medium.

5. An operation method of the electronic brake system according to claim 4, comprising
a first braking mode in which, as the hydraulic pressure of the pressurized medium transferred from the hydraulic pressure providing unit to the wheel cylinder gradually increases, the hydraulic pressure is primarily provided according to a forward movement of the hydraulic piston; and a second braking mode in which the hydraulic pressures is secondarily provided according to a backward movement of the hydraulic piston after the first braking mode.

6. The operation method of the electronic brake system according to claim 5, wherein in the first braking mode,
the second valve is opened, and
the hydraulic pressure generated in the first pressure chamber according to a forward movement of the hydraulic piston is provided to the first hydraulic circuit by sequentially passing through the first hydraulic flow path and the second hydraulic flow path, and provided to the second hydraulic circuit by sequentially passing through the first hydraulic flow path and the third hydraulic flow path, and
at least a part of the hydraulic pressure generated in the first pressure chamber is provided to the second pressure chamber by sequentially passing through the first hydraulic flow path, the sixth hydraulic flow path, the fifth hydraulic flow path, and the fourth hydraulic flow path.

7. The operation method of the electronic brake system according to claim 6, wherein in the second braking mode,
the second valve is closed, and
the hydraulic pressure generated in the second pressure chamber according to a backward movement of the hydraulic piston after the first braking mode is provided to the first hydraulic circuit by sequentially passing through the fourth hydraulic flow path, the fifth hydraulic flow path, and the second hydraulic flow path, and provided to the second hydraulic circuit by sequentially passing through the fourth hydraulic flow path, the fifth hydraulic flow path, and the third hydraulic flow path.

8. The operation method of the electronic brake system according to claim 7, wherein in a releasing of the second braking mode,
the second valve is closed, and
a negative pressure is generated in the second pressure chamber according to a forward movement of the hydraulic piston such that the pressurized medium provided to the first hydraulic circuit is recovered to the second pressure chamber by sequentially passing through the second hydraulic flow path, the fifth hydraulic flow path, and the fourth hydraulic flow path, and the pressurized medium provided to the second hydraulic circuit is recovered to the second pressure chamber by sequentially passing through the third hydraulic flow path, the fifth hydraulic flow path, and the fourth hydraulic flow path.

9. The operation method of the electronic brake system according to claim 6, wherein in a releasing of the first braking mode,
the second valve is opened, and
a negative pressure is generated in the first pressure chamber according to a backward movement of the hydraulic piston such that the pressurized medium provided to the first hydraulic circuit is recovered to the first pressure chamber by sequentially passing through the second hydraulic flow path, the fifth hydraulic flow path, the sixth hydraulic flow path, and the first hydraulic flow path, and the pressurized medium provided to the second hydraulic circuit is recovered to the first pressure chamber by sequentially passing through the third hydraulic flow path, the fifth hydraulic flow path, the sixth hydraulic flow path, and the first hydraulic flow path, and
the pressurized medium in the second pressure chamber is supplied to the first pressure chamber by sequentially passing through the fourth hydraulic flow path, the fifth hydraulic flow path, the sixth hydraulic flow path, and the first hydraulic flow path.

10. The electronic brake system according to claim 4, wherein the hydraulic pressure control unit further includes a third valve provided in the fourth hydraulic flow path to control a flow of the pressurized medium.

11. The electronic brake system according to claim 10, wherein the third valve is provided as a solenoid valve for controlling bidirectional flows of the pressurized medium.

12. The electronic brake system according to claim 2, further comprising a dump controller provided between the reservoir and the hydraulic pressure providing device to control a flow of the pressurized medium,
wherein the dump controller includes:
a dump flow path provided to connect the first pressure chamber to the reservoir; a dump check valve provided in the dump flow path to allow only a flow of the pressurized medium from the reservoir toward the first pressure chamber; a bypass flow path connected in parallel to the dump check valve on the dump flow path; and a dump valve provided in the bypass flow path to control bidirectional flows of the pressurized medium.

13. The electronic brake system according to claim 1, further comprising a cut valve provided in the back up flow path to control a flow of the pressurized medium.

14. An operation method of the electronic brake system according to claim 13, wherein
in a normal operation mode,
the inspection valve is closed to seal the master chamber, and the cut valve is closed but the simulator valve is opened to communicate the simulation chamber with the reservoir such that as the brake pedal operates for the simulation piston to compress the elastic member, and an elastic restoring force of the elastic member is provided to a driver as a pedal feeling.

15. The operation method of the electronic brake system according to claim 14, wherein
in an abnormal operation mode,
the inspection valve is opened for the master chamber to communicate with the first hydraulic circuit, and the simulator valve is closed but the cut valve is opened for the simulation chamber to communicate with the first hydraulic circuit, and
the pressurized medium in the simulation chamber is provided to the first hydraulic circuit through the backup flow path according to a stepping force of the brake pedal, the pressurized medium in the mater chamber is provided to the first hydraulic circuit by sequentially passing through the auxiliary backup flow path and the backup flow path, and at least a part of the pressurized medium provided to the first hydraulic circuit is provided to the second hydraulic circuit.

16. The operation method of the electronic brake system according to claim 14, wherein
in an inspection mode of inspecting a leak of the integrated master cylinder or the simulator valve,
the simulator valve and the inspection valve are closed,
the hydraulic pressure generated according to an operation of the hydraulic pressure providing unit is provided to the simulation chamber by sequentially passing through the hydraulic pressure control unit and the backup flow path, and
an expected hydraulic pressure value expected to occur based on a displacement amount of the hydraulic piston is compared with a hydraulic pressure value measured by a pressure sensor in the first hydraulic circuit or the simulation chamber to identify a leak.

17. The electronic brake system according to claim 1, further comprising a reservoir flow path configured to communicate the integrated master cylinder with the reservoir, and
wherein the reservoir flow path includes a first reservoir flow path connecting the reservoir to the simulation chamber and a second reservoir flow path branched from an upstream side of the simulation flow path and rejoining at a downstream side of the simulation flow path.

18. The electronic brake system according to claim 17, further comprising a reservoir valve provided in the second reservoir flow path, and allowing only a flow of the pressurized medium from the reservoir toward the simulation chamber.

19. The electronic brake system according to claim 1, wherein the first hydraulic circuit includes: a first inlet valve and a second inlet valve provided to control the flow of the pressurized medium to be supplied to a first wheel cylinder and a second wheel cylinder, respectively; and
the second hydraulic circuit includes: a third inlet valve and a fourth inlet valve provided to control the flow of the pressurized medium to be supplied to a third wheel cylinder and a fourth wheel cylinder, respectively, and a first outlet valve and a second outlet valve provided to control the flow of the pressurized medium to be discharged from the third wheel cylinder and the fourth wheel cylinder to the reservoir, respectively, and
the backup flow path is provided to connect at least one of downstream sides of the first and second inlet valves to the simulation chamber.

\* \* \* \* \*